(12) United States Patent
Boger et al.

(10) Patent No.: US 11,130,385 B2
(45) Date of Patent: Sep. 28, 2021

(54) THERMAL MANAGEMENT SYSTEM FOR A VEHICLE

(71) Applicant: Mahle International GmbH, Stuttgart (DE)

(72) Inventors: Markus Boger, Stuttgart (DE); Sascha Lindauer, Schorndorf (DE); Thomas Strauss, Notzingen (DE)

(73) Assignee: Mahle International GmbH

( * ) Notice: Subject to any disclaimer, the term of this patent is extended or adjusted under 35 U.S.C. 154(b) by 294 days.

(21) Appl. No.: 16/435,109

(22) Filed: Jun. 7, 2019

(65) Prior Publication Data

US 2019/0375270 A1 Dec. 12, 2019

(30) Foreign Application Priority Data

Jun. 8, 2018 (DE) .......................... 102018209169.2

(51) Int. Cl.
*B60H 1/00* (2006.01)
*F01P 3/20* (2006.01)
(Continued)

(52) U.S. Cl.
CPC ..... *B60H 1/00392* (2013.01); *B60H 1/00028* (2013.01); *B60H 1/00278* (2013.01);
(Continued)

(58) Field of Classification Search
CPC ............ B60H 1/00392; B60H 1/00028; B60H 1/00278; B60H 1/00328; B60H 1/00342;
(Continued)

(56) References Cited

U.S. PATENT DOCUMENTS

2015/0273976 A1 10/2015 Enomoto et al.
2017/0174038 A1 6/2017 Scheldel et al.
(Continued)

FOREIGN PATENT DOCUMENTS

DE 102012108043 A1 5/2014
DE 112013003104 T5 3/2015
(Continued)

OTHER PUBLICATIONS

English abstract for DE-102012108043.

*Primary Examiner* — Emmanuel E Duke
(74) *Attorney, Agent, or Firm* — Fishman Stewart PLLC

(57) ABSTRACT

A thermal management system for a vehicle may include a refrigerant circuit in which a refrigerant circulates, as well as a heating circuit, a first coolant circuit configured for a temperature control of a drive device of the vehicle, and a second coolant circuit configured for a temperature control of an electrical store of the vehicle in which a coolant circulates. The system may further include a chiller incorporated in the refrigerant circuit and a chiller guide fluidically separate from the refrigerant circuit. The chiller guide may have a chiller path configured to conduct the coolant and which extends through the chiller, and may have a bypass path configured to conduct the coolant and which circumvents the chiller. The system may additionally include a chiller valve device configured to selectively fluidically connect the first coolant circuit and the second coolant circuit to the chiller path and the bypass path.

38 Claims, 12 Drawing Sheets

(51) Int. Cl.
 *F01P 1/00* (2006.01)
 *F01P 7/14* (2006.01)
 *B60H 1/06* (2006.01)
 *B60H 1/32* (2006.01)
 *B60K 11/04* (2006.01)

(52) U.S. Cl.
 CPC ..... *B60H 1/00328* (2013.01); *B60H 1/00342* (2013.01); *B60H 1/00485* (2013.01); *B60H 1/00642* (2013.01); *B60H 1/00885* (2013.01); *B60H 1/06* (2013.01); *B60H 1/3208* (2013.01); *B60H 1/3228* (2019.05); *B60K 11/04* (2013.01); *F01P 1/00* (2013.01); *F01P 3/20* (2013.01); *F01P 7/14* (2013.01); *B60H 2001/00164* (2013.01); *B60H 2001/00957* (2013.01); *B60H 2001/326* (2013.01); *B60H 2001/3266* (2013.01); *B60Y 2200/92* (2013.01); *B60Y 2306/05* (2013.01); *F01P 2007/146* (2013.01)

(58) Field of Classification Search
 CPC ............ B60H 1/00485; B60H 1/00642; B60H 1/00885; B60H 1/06; B60H 1/3208; B60H 1/3228; B60H 1/00271; B60H 1/00899; B60H 1/004; B60H 1/32284; B60H 1/00385; B60H 1/03; B60H 1/3204; B60H 2001/3266; B60H 2001/00164; B60H 2001/00957; B60H 2001/326; B60H 2001/0307; F01P 3/20; F01P 3/00; F01P 7/14; F01P 7/165; F01P 2007/146; F01P 2050/24; B60K 11/04; B60K 2001/003; B60Y 2200/92; B60Y 2306/05; Y02E 60/10; H01M 10/613; H01M 10/625
 See application file for complete search history.

(56) References Cited

U.S. PATENT DOCUMENTS

2017/0253105 A1   9/2017   Allgaeuer et al.
2018/0086224 A1*  3/2018   King .................. H01M 10/613

FOREIGN PATENT DOCUMENTS

DE   102014217960 A1   3/2016
DE   102014226346 A1   6/2016

\* cited by examiner

THERMAL MANAGEMENT SYSTEM FOR A VEHICLE

CROSS-REFERENCE TO RELATED APPLICATIONS

This application claims priority to German Patent Application No. DE 10 2018 209 169.2, filed on Jun. 8, 2018, the contents of which are hereby incorporated by reference in its entirety.

TECHNICAL FIELD

The present invention relates to a thermal management system for a vehicle having an electric drive device and having an electrical store for providing a supply to the drive device. The invention furthermore relates to a vehicle of said type.

BACKGROUND

Vehicles having an electric drive device, that is to say at least partially electrically driven vehicles, dispense with the use of combustion engines or at least reduce said use. The waste heat of the combustion engine available for the thermal management of vehicles with a combustion engine is thus absent in the case of electrically driven vehicles, or is at least reduced. Vehicles having an electric drive device furthermore generally have an electrical energy store, for example an accumulator, in which electrical energy is stored and which provides a supply of electricity to the drive device. In the case of such vehicles, for the air-conditioning of the vehicle interior compartment and of components of the vehicle such as the store, energy from the store is also required, wherein this consumption has an adverse effect on the energy available for the drive device, and in particular leads to a reduced range of the vehicle. Energy-efficient thermal management is therefore sought in the case of such vehicles.

In associated thermal management systems, it is conceivable to provide different thermal circuits in which in each case one temperature-control medium circulates and different heat exchangers are incorporated. It is for example conceivable to provide different circuits for the drive device, the store and for the air-conditioning of the interior compartment of the vehicle, which circuits each permit separate and individual temperature control of store, drive device and interior compartment. Such thermal management systems however require a multiplicity of different heat exchangers, such that they firstly have a large structural space requirement and secondly reduce the efficiency of the thermal management system.

SUMMARY

The present invention is therefore concerned with the object of specifying, for a thermal management system for a vehicle which has an electric drive device and an electrical store for providing a supply to the drive device, and for a vehicle of said type, improved or at least different embodiments which are distinguished by increased energy efficiency and/or a reduced structural space requirement and/or less expensive production.

Said object is achieved according to the invention by means of the subject matter of the independent claim(s). The dependent claim(s) relate to advantageous embodiments.

The present invention is based on the general concept of equipping a thermal management system for a vehicle, having an electric drive device and having an electrical store for providing a supply to the drive device, with four circuits which each conduct a temperature-control fluid and which serve for the temperature control of different constituent parts of the vehicle and of coupling several of these circuits to one another by means of common heat exchangers and/or common fluid guides and fluid controllers, in such a way that a reduced number of heat exchangers and variable guidance of the temperature-control fluids is possible. This leads to increased efficiency of the thermal management system, such that ultimately the energy provided by the store is available to a greater degree for the drive device, and thus the range of the vehicle is increased. Furthermore, such a thermal management system can be produced inexpensively and in a structural-space-saving manner.

According to the concept of the invention, the thermal management system has a first circuit which serves for the temperature control of a vehicle interior compartment of the vehicle and which will hereinafter be referred to as refrigerant circuit. During operation, a refrigerant as temperature-control fluid circulates in the refrigerant circuit in a manner driven by a compressor, which will hereinafter be referred to as refrigerant compressor. Also incorporated in the refrigerant circuit are a condenser for condensing the refrigerant and an evaporator for evaporating the refrigerant. Here, the evaporator serves for cooling air to be fed to the vehicle interior compartment of the vehicle, which, for this purpose, may flow through or flow around the evaporator. The thermal management system has a further circuit, which will hereinafter be referred to as heating circuit. The heating circuit is fluidically separate from the refrigerant circuit. A coolant as temperature-control medium circulates in the heating circuit during operation, which coolant is conveyed by a pump of the heating circuit, hereinafter referred to as heating circuit pump. Also incorporated in the heating circuit is a radiator which heats the air to be fed to the vehicle interior compartment. The radiator or the heating circuit thus serve for the temperature control of the vehicle interior compartment. A further circuit, which is fluidically separate from the refrigerant circuit, of the thermal management system is a coolant circuit, which will hereinafter be referred to as first coolant circuit. The first coolant circuit serves for the temperature control, in particular the cooling, of the drive device, wherein a coolant as temperature-control medium circulates in the first coolant circuit during operation. The first coolant circuit has a pump, hereinafter referred to as first coolant pump, for conveying the coolant. Here, the drive device is connected in heat-transferring fashion to the first coolant circuit. This may also be realized by means of an incorporation of the drive device in the first coolant circuit. The thermal management system has a further circuit, hereinafter referred to as second coolant circuit, which serves for the temperature control of the store. A coolant as temperature-control fluid circulates in the second coolant circuit during operation. The coolant is conveyed by a pump of the second coolant circuit, hereinafter referred to as second coolant pump. The second coolant circuit is furthermore, for the temperature control of the store, connected in heat-transferring fashion to the store, wherein this may be realized by means of an incorporation of the store in the coolant circuit. The thermal management system furthermore has a heat exchanger for exchanging heat with the surroundings of the thermal management system, for example with air surrounding or fed to the heat exchanger. The heat exchanger serves as a common heat exchanger of the heating circuit and of the first coolant circuit. That is to say, the heating circuit and the first coolant circuit have a common heat exchanger. In this way, the number of required heat exchangers of the thermal management system is reduced, and thus the structural space requirement and the efficiency of the thermal management system are improved. Here, it is possible for coolant of the first coolant circuit or coolant of the heating circuit to be selectively fed to the heat exchanger. It is likewise possible for coolant of the first coolant circuit and coolant of the heating circuit to be fed to the heat exchanger. For this purpose, the thermal management system has a heat exchanger valve device, which is designed correspondingly. The condenser of the refrigerant circuit is, for the heat transfer to the coolant circulating through the heating circuit, incorporated in the heating circuit in a manner fluidically separated from the refrigerant circuit. That is to say, the heat absorbed from the refrigerant by means of the condenser is fed to the coolant of the heating circuit, wherein said heat can be released via the heat exchanger and/or the radiator. A chiller is also incorporated in the refrigerant circuit. The chiller serves for the heat transfer to the refrigerant. Here, the heat originates from one of the coolant circuits. That is to say, a common chiller is provided for the heat transfer from both coolant circuits to the refrigerant circuit. For this purpose, the thermal management system has a chiller guide which is fluidically separate from the refrigerant circuit. The chiller guide has a chiller path, which is fluidically separate from the refrigerant circuit and which conducts coolant, and has a bypass path, which is fluidically separate from the refrigerant circuit and which conducts coolant, wherein the chiller path leads through the chiller and the bypass path circumvents the chiller. Furthermore, both the first coolant circuit and the second coolant circuit are each fluidically connected to the chiller path and to the bypass path both upstream and downstream of the chiller. In order to be able to conduct coolant from the first coolant circuit or from the second coolant circuit through the chiller or past the chiller, the thermal management system furthermore has a valve device, which will hereinafter be referred to as chiller valve device. The chiller valve device is designed so as to, upstream of the chiller, selectively fluidically connect the first coolant circuit to the chiller path and the second coolant circuit to the bypass path or vice versa. If the chiller valve device connects the first coolant circuit to the chiller path and the second coolant circuit to the bypass path, coolant originating from the first coolant circuit flows through the chiller and thus, via the chiller, exchanges heat with the refrigerant of the refrigerant circuit, whereas coolant originating from the second coolant circuit is conducted past the chiller, and thus exchanges no heat with the refrigerant. In the case of a reversed connection, that is to say in the case of a connection of the second coolant circuit to the chiller path and of the first coolant circuit to the bypass path, coolant originating from the second coolant circuit flows through the chiller and thus exchanges heat with the refrigerant of the refrigerant circuit, whereas coolant originating from the first coolant circuit is conducted past the chiller and thus exchanges no heat with the refrigerant. The thermal management system furthermore has a control device for operating the thermal management system, in particular for actuating and controlling, in open-loop and/or closed-loop fashion, the valve devices and the individual valves.

The common heat exchanger of the first coolant circuit and of the heating circuit is preferably a heat exchanger which is flowed through at one side by the coolant and at the other side by air from the surroundings of the thermal management system. The heat exchanger is preferably a low-temperature heat exchanger. This permits, in the presence of normal ambient temperatures of the thermal management system, an easy implementation of the heat exchanger and increased efficiency in the exchange of heat between coolant and surroundings, in particular air.

The condenser of the refrigerant circuit releases the heat obtained during the condensation to the coolant in the heating circuit, as described above. The condenser may therefore also be referred to as indirect condenser.

The chiller incorporated in the refrigerant circuit is a heat exchanger which transfers heat to the refrigerant flowing through the chiller.

The electric drive device generally has at least one electric motor or is designed as an electric motor of said type. The store is capable of reversibly storing electrical energy, for example in the form of electrical charge. The store is thus in particular a rechargeable battery or an accumulator.

In the present case, an incorporation in the respective circuit is to be understood to mean an integration such that the corresponding medium of the respective circuit flows through said component. That is to say, components incorporated in the refrigerant circuit are flowed through by the refrigerant during operation. Analogously, the components incorporated in the respective coolant circuit or heating circuit are flowed through by coolant during operation.

Preferred embodiments provide such a design of the chiller valve device that, downstream of the chiller, any desired connection of the chiller path and bypass path to the respective coolant circuit is possible. It is thus possible for the coolant flowing through the chiller path to be fed, after flowing through the chiller, to the first coolant circuit and/or to the second coolant circuit. This applies correspondingly to the coolant flowing through the bypass path. That is to say, a mixing or an exchange of coolant originating from the first coolant circuit or the second coolant circuit is made possible downstream of the chiller. For this purpose, the chiller valve device is designed so as to, downstream of the chiller, fluidically connect the first coolant circuit to the chiller path and the second coolant circuit to the bypass path or the second coolant circuit to the chiller path and the first coolant circuit to the bypass path. This permits increased variability of the use of the thermal management system in order, in different operating modes, in particular in the presence of different thermal boundary conditions and/or different temperature control requirements, to be able to make adaptations in the thermal management with increased efficiency with a reduced number of heat exchangers and a reduced structural space requirement.

In preferred embodiments, in the refrigerant circuit, the evaporator and the chiller are incorporated in different branches of the refrigerant circuit, which branches are preferably parallel to one another. That is to say, the refrigerant circuit has a chiller branch, in which the chiller is incorporated, and an evaporator branch, which is preferably parallel to the chiller branch and in which the evaporator is incorporated. This permits variable and individual guidance of the refrigerant through the chiller and the evaporator. In particular, in this way, it is possible for the flow of refrigerant through the chiller and the evaporator to be configured independently of one another. More variable operation of the thermal management system is consequently possible. In particular, in this way, refrigerant can flow through the chiller and not through the evaporator, or vice versa.

It is conceivable for the refrigerant circuit to be equipped with further evaporators, wherein these are preferably likewise each incorporated in an associated branch of the refrigerant circuit, preferably in parallel. The use of further evaporators permits more individual temperature control, in particular cooling, of the vehicle interior compartment. In particular, in this way, it is possible to define different climate zones within the vehicle interior compartment, wherein the respective climate zone is assigned at least one such evaporator.

Embodiments have proven to be advantageous in which the heating circuit has a main branch and a bypass branch which preferably runs parallel to the main branch, wherein the main branch of the heating circuit, hereinafter also referred to as heating circuit main branch, leads through the heat exchanger, whereas the radiator is incorporated in the bypass branch. In this way, it is possible for the coolant flowing through the heating circuit to be individually conducted through the heat exchanger or fed to the radiator. This permits further variability in the use of the thermal management system. For the individual and variable guidance of the coolant in the heating circuit through the heating circuit main branch and/or the heating circuit bypass branch, the thermal management system has the heat exchanger valve device, which is designed correspondingly for this purpose. In particular, the heat exchanger valve device may have a three-way valve for this purpose.

It is furthermore preferable if the first coolant circuit has a main branch and a bypass branch running preferably parallel to the main branch, which branches will hereinafter be referred to as coolant circuit main branch and coolant circuit bypass branch. Here, the coolant circuit bypass branch leads through the heat exchanger, whereas the coolant circuit bypass branch circumvents the heat exchanger. In particular, it is possible in this way for the heat in the coolant of the first coolant circuit to be fed at least partially past the heat exchanger and via the chiller path to the chiller, such that more heat is released to the refrigerant. The heat exchanger valve device is used for the variable guidance of the coolant flowing through the first coolant circuit through the coolant circuit main branch and coolant circuit bypass branch. For this purpose, the heat exchanger valve device may in particular have a three-way valve.

In principle, the heating circuit and the first coolant circuit may be led independently of one another through the common heat exchanger.

Embodiments are preferred in which the heating circuit and the first coolant circuit are led jointly through the heat exchanger. In particular, the heating circuit main branch and the coolant circuit main branch of the first coolant circuit are led fluidically jointly through the heat exchanger. Downstream of the heat exchanger, the coolant is divided up into the first coolant circuit and the heating circuit. This leads to a simplified design of the heat exchanger and/or of the heating circuit and of the first coolant circuit.

The second coolant circuit advantageously has two branches running in parallel, which will hereinafter also be referred to as arms of the second coolant circuit. Here, a coolant circuit main arm leads through the chiller guide and thus through the chiller path and/or bypass path, whereas a coolant circuit bypass arm circumvents the chiller guide. The coolant flowing through the second coolant circuit is thus conducted through the coolant circuit main arm in order to flow through the chiller guide, that is to say the chiller path and/or the bypass path, and is conducted through the coolant circuit bypass arm in order to at least partially or proportionately circumvent the chiller guide. In this way, it is possible in particular for a part of the coolant flowing through the second coolant circuit to be conducted through the chiller and for another part of the coolant to be conducted past the chiller. In particular because large coolant volume flows can arise in the case of the heat dissipation from the store via the chiller, it is advantageous in this case for a part of the coolant to be conducted past the chiller in order to limit a pressure loss in the coolant across the chiller and consequently the power of the second coolant pump.

A valve, hereinafter also referred to as coolant valve, is expediently provided for dividing up the coolant flowing through the second coolant circuit between the coolant circuit main arm and the coolant circuit bypass arm. The coolant valve may be of simple design, in particular as a shut-off valve. A simple implementation is realized if the coolant valve is arranged in the coolant circuit bypass arm.

The chiller valve device may basically be of any desired design as long as it can conduct coolant originating from the first coolant circuit and from the second coolant circuit selectively through the chiller path and the bypass path.

It is conceivable for the chiller valve device to be equipped, upstream of the chiller, with a four-way valve, which will hereinafter also be referred to as first four-way valve. The four-way valve has two inlets and two outlets, wherein the respective inlet can be fluidically connected to the respective outlet by means of the adjustment of the four-way valve into different positions. Here, one of the outlets is fluidically connected to the chiller path, and the other outlet is fluidically connected to the bypass path. The first four-way valve is preferably adjustable between a first position and a second position in order to conduct coolant originating from the first coolant circuit or from the second coolant circuit through the chiller path. Here, in the first position, the first coolant circuit is fluidically connected to the chiller path and the second coolant circuit is fluidically connected to the bypass path, such that coolant originating from the first coolant circuit is conducted through the chiller and coolant originating from the second coolant circuit is conducted past the chiller. By contrast, in the second position, the first four-way valve produces a fluidic connection between the second coolant circuit and the chiller path and the first coolant circuit and the bypass path, such that coolant originating from the second coolant circuit is conducted through the chiller and coolant originating from the first coolant circuit is conducted past the chiller.

The chiller valve device may have a second four-way valve which is preferably adjustable independently of the first four-way valve and which is arranged downstream of the chiller and which permits any desired fluidic connection of the chiller path and of the bypass path to the first coolant circuit and to the second coolant circuit. In this way, it is possible for coolant which has previously flowed through the chiller path and thus through the chiller to be fed to one of the coolant circuits and for coolant that has been conducted past the chiller via the bypass path to be fed to the other coolant circuit. In particular, it is thus possible for coolant originating from the first coolant circuit upstream of the chiller to be fed to the second coolant circuit downstream of the chiller and vice versa. The second four-way valve is in this case adjustable between a first position and a second position. In the first position, the second four-way valve fluidically connects the chiller path to the first coolant circuit and fluidically connects the bypass path to the second coolant circuit. By contrast, in the second position, the second four-way valve fluidically connects the chiller path to the second coolant circuit and the bypass path to the first coolant circuit.

Thus, if the chiller valve device has both the first four-way valve and the second four-way valve, the chiller valve device is adjustable between a total of four positions in order to permit any desired guidance of the coolant from the first coolant circuit and the second coolant circuit through the chiller or past the chiller and subsequently any desired feed of the coolant into the first coolant circuit or into the second coolant circuit.

For the closed-loop control of the flow of the refrigerant through the chiller, a throttle device is preferably provided upstream of the chiller in the refrigerant circuit, in particular in the chiller branch. In this way, it is possible in particular for a flow of the refrigerant circuit through the chiller to be shut off, such that the chiller is situated in a so-called passive mode, in which the exchange of heat between the coolant flowing through the chiller and the refrigerant is interrupted or at least considerably reduced. Here, the throttle device may be of any desired design. In particular, the throttle device may be designed as an expansion valve, for example an electric expansion valve (EXV) or a thermostatic expansion valve (TXV) or may have such a valve.

It is likewise advantageous if, upstream of the respective evaporator of the refrigerant circuit, there is arranged a throttle device for changing the flow of the refrigerant through the evaporator, in particular also for shutting off the flow of the refrigerant through the evaporator, wherein said throttle device may also be designed as an expansion valve.

The first coolant circuit serves, as described above, primarily for the temperature control, in particular the cooling, of the drive device. It is advantageous for the first coolant circuit to also be connected in heat-transferring fashion to further constituent parts of the vehicle which generate heat during operation in order to cool these during operation and thus transfer heat to the coolant. Said heat can then be used in an improved manner for heating other components of the vehicle, for example the store or the vehicle interior compartment. Here, it is possible in particular for an on-board electronics system of the vehicle to be connected in heat-transferring fashion to the first coolant circuit, in particular incorporated in the first coolant circuit. The on-board electronics system also includes in particular the electronics system of the drive device.

It is advantageous for an internal heat exchanger to be arranged in the refrigerant circuit, which internal heat exchanger is incorporated into the refrigerant circuit upstream of the refrigerant compressor, on the one hand, and downstream of the condenser, on the other hand.

The variable guidance of the coolant and of the refrigerant within the thermal management system and the uses of the common heat exchanger and of the common chiller make it possible for the thermal management system to be operated in different operating modes, which are each case adapted to different boundary conditions and different temperature-control requirements. This may be realized in particular with the aid of the control device, which may be connected to the corresponding valve devices, throttle devices, compressors, pumps and sensor arrangements of the thermal management system or of the vehicle.

In a first cooling mode of the thermal management system, it is for example possible for the first coolant circuit to be conducted via the bypass path past the chiller, such that the coolant in the first coolant circuit does not exchange any heat with the refrigerant via the chiller. By contrast, the second coolant circuit is conducted via the chiller path, such that coolant circulating through the second coolant circuit exchanges heat with the refrigerant via the chiller. Furthermore, for example by means of the second four-way valve, a fluidic separation is realized between the first coolant circuit and the second coolant circuit. At the same time, coolant flowing through the heating circuit is conducted via the heat exchanger, and the radiator is circumvented, for example by virtue of the coolant in the heating circuit being conducted exclusively via the heating circuit main branch. The first cooling mode is implemented in particular in the presence of high outside temperatures, for example above 20 or 30° C., such that both the vehicle interior compartment and the store are in need of cooling, and cooling of the drive device is also desired. Here, the coolant flowing through the first coolant circuit is conducted, preferably entirely, via the heat exchanger. The heat of the accumulator is released to the coolant of the second coolant circuit and is discharged via the chiller to the refrigerant, wherein the refrigerant dissipates said heat via the condenser to the coolant of the heating circuit. Said coolant is subsequently conducted via the heat exchanger and thus releases heat to the surroundings of the thermal management system or of the vehicle, in particular to the air conducted or conveyed through the heat exchanger, and thus in turn cools down. Analogously, the evaporator of the refrigerant circuit releases the heat, obtained as a result of the cooling of the air to be fed to the vehicle interior compartment, via the condenser to the coolant of the heating circuit, which, as described above, is cooled in the heat exchanger. Since, in such an operating mode, there is normally no demand for heating in the vehicle interior compartment, the radiator of the heating circuit is circumvented, that is to say the entire flow of the coolant in the heating circuit is conducted via the heat exchanger. The heat generated in the drive device is fed to the coolant in the first coolant circuit, wherein said heat is dissipated by means of the heat exchanger, such that the coolant is cooled. Here, it is preferable for all of the coolant flowing through the first coolant circuit to be conducted through the heat exchanger in order to achieve efficient cooling of the drive device.

In a further, second cooling mode, more energy-efficient cooling is possible. Here, the bypass path is connected upstream of the chiller to the first coolant circuit and downstream of the chiller to the second coolant circuit, whereas the chiller path is connected upstream of the chiller to the second coolant circuit and downstream of the chiller to the first coolant circuit, or vice versa. That is to say, coolant originating from the first coolant circuit upstream of the chiller is fed to the second coolant circuit downstream of the chiller and vice versa. The coolant conducted through the heat exchanger and thus cooled is thus fed to the second coolant circuit, such that cooling of the store is performed. At the same time, the flow of refrigerant through the chiller is shut off. The flow of refrigerant through the evaporator may be shut off as required, or refrigerant may flow through the evaporator. The shutting-off of the flow through the chiller places the chiller into the so-called passive mode, such that the heat transfer from the coolant to the refrigerant is shut off or is at least considerably reduced. At the same time, the first coolant circuit is conducted through the heat exchanger, such that cooling of the coolant takes place substantially via the heat exchanger. Thus, in the second cooling mode, the two coolant circuits are combined to form one common coolant circuit, wherein a dissipation of heat from the coolant takes place via the heat exchanger. The heat absorbed in the coolant in the store, in the drive device and possibly in the on-board electronics system is thus released via the heat exchanger to the surroundings. The second cooling mode is used in particular in the presence of moderate ambient temperatures, for example between 15 and 20° C., because, in the presence of such ambient conditions, there is normally no demand for heating and cooling in the vehicle interior space. Furthermore, if the drive device is in a nominal range or is under moderate load, the cooling demand of the drive device is also reduced, such that the second cooling mode can be used. Cooling by means of the chiller is thus omitted, such that the energy demand can be reduced and efficiency can be increased.

It is likewise conceivable for the thermal management system to be operated in the second cooling mode during a charging process of the store under correspondingly moderate ambient conditions, that is to say in particular temperatures below 20° C.

In a third cooling mode, in relation to the first cooling mode, the flow of refrigerant through at least one of the evaporators of the refrigeration circuit, preferably through all evaporators of the refrigeration circuit, is additionally shut off, such that the at least one evaporator is passive, that is to say does not cool the air to be fed to the vehicle interior compartment. This results in a further reduction of the energy requirement. The third cooling mode is used for example if a cooling demand exists only at the store but not in the vehicle interior compartment. This may be the case during the charging process of the store and outside the operation of the vehicle and/or when the vehicle is unoccupied. Here, the coolant in the first coolant circuit may be conducted past or conducted through the heat exchanger.

The thermal management system may likewise be operated in different heating modes.

In a first heating mode, the first coolant circuit is conducted via the chiller path and the chiller, whereas the second coolant circuit is conducted via the bypass path past the chiller, such that, overall, there is a separate flow of coolant through the two coolant circuits. Furthermore, coolant flowing through the heating circuit is conducted via the radiator, and the heat exchanger is at least partially circumvented. The heat absorbed in the heating circuit via the condenser is thus fed substantially to the radiator, such that the latter can heat the air to be fed to the vehicle interior compartment. Furthermore, the flow of refrigerant through the chiller is shut off, such that the chiller is in the passive mode. The coolant flowing through the first coolant circuit is furthermore conducted through the heat exchanger. Thus, in this heating mode, substantially no cooling of the coolant flowing through the second coolant circuit is performed. The first heating mode is used in particular if there is no demand for cooling of the store whereas the vehicle interior compartment is to be heated. This is the case in particular in the presence of ambient temperatures of between 5° C. and 15° C., in particular between 5° C. and 10° C. The air to be fed to the vehicle interior compartment is conducted firstly through the evaporator of the refrigerant circuit and subsequently through the radiator, in order, via the evaporator, to reduce the humidity in the air and subsequently heat the air with the aid of the radiator before said air is fed to the vehicle interior compartment. The energy that is absorbed during the dehumidification and/or cooling of the air at the evaporator and introduced by means of the compressor is discharged from the refrigerant circuit into the heating circuit at the condenser, and is used at the radiator for the purposes of heating the air.

If the heating power in the first heating mode is not sufficient, the thermal management system may be operated in a second heating mode in that, in relation to the first heating mode, refrigerant flows through the chiller in order to transfer heat from the coolant from the first coolant circuit to the refrigerant and, via the refrigerant, to the heating circuit. In the presence of a further increasing heating demand, it is furthermore possible for the flow of the coolant in the heating circuit and/or in the first coolant circuit to be conducted at least partially past the heat exchanger, such that the heat in the coolant is transferred predominantly to the radiator or via the chiller to the refrigerant.

In the first or in the second heating mode, in the presence of a high level of humidity in the ambient air, it may occur that the evaporator, used for the dehumidification of the air, of the refrigerant circuit releases more heat to the coolant than is usual or required. In this case, it is possible for one part of the coolant flowing through the heating circuit to be conducted through the heat exchanger and for the other part to be conducted past the heat exchanger. The excess heat in the coolant is thus released via the heat exchanger to the surroundings, whereas the heat in the coolant that is conducted past the heat exchanger is fed to the radiator and thus to the air that is to be fed to the vehicle interior compartment.

In the presence of further falling outside temperatures, for example in the presence of temperatures below 5° C., the present heat of the thermal management system cannot suffice to adequately heat the vehicle interior compartment and/or further components of the vehicle. In this case, the coolant of the first coolant circuit can, after absorbing the heat from the drive device, and possibly also from the on-board electronics system, be conducted at least partially through the heat exchanger if the temperature of the coolant at an outlet of the drive device lies below the temperature, in particular of the air, outside the heat exchanger. The coolant thus absorbs heat from the surroundings via the heat exchanger, which heat is fed to the refrigerant via the chiller and to the radiator via the heating circuit. In this case, the heat exchanger is thus used for pumping heat out of the surroundings.

In the presence of further falling temperatures, that is to say temperatures below freezing or lower, for example below −10° C., it may occur that the above-stated measures for heating, in particular the vehicle interior compartment and/or the store, are inadequate.

The thermal management system preferably has an electric heating device which is used in particular if the waste heat of the drive device, of the power electronics of the evaporator and possibly the heat absorbed by means of the heat exchanger are inadequate. The electric heating device is used here for heating coolant and, during operation, heats coolant of the heating circuit and/or of the second coolant circuit. The heating device is thus used in particular and primarily for heating the vehicle interior compartment and/ or the store. For this purpose, the heating device is preferably incorporated in an associated heating branch of the heating circuit. The heating device may also be incorporated in a heating branch of the second coolant circuit. The heating device is advantageously incorporated in the coolant circuit bypass arm of the second coolant circuit. The thermal management system can thus be formed and/or produced and/or controlled in a particularly simple manner.

Thus, if the outside temperatures fall to such an extent that the heating demand cannot be covered, the electric heating device is set in operation in order to heat coolant in the heating circuit and/or coolant of the second coolant circuit, such that coolant at an elevated temperature is fed to the radiator and/or to the store. In a corresponding heating mode, which will hereinafter be referred to as fourth heating mode, the electric heating device is thus used in addition to the measures described in the above heating modes in order to cover the heating demand in the vehicle interior compartment by means of the radiator, by virtue of coolant from the heating circuit being at least partially, preferably only partially, conducted through the heating device. Analogously, for this purpose, in a fifth heating mode, coolant from the second coolant circuit may be conducted at least partially, preferably only partially, through the heating device in order to additionally heat the store.

It is conceivable for the heating device to be used for heating the coolant in the heating circuit and thus for the heating demand in the vehicle interior compartment and for heating the coolant in the second coolant circuit and thus for heating the store. Here, the fourth and the fifth heating modes are thus implemented simultaneously. This may in particular be realized by virtue of coolant from the second coolant circuit and from the heating circuit being able to flow simultaneously through the heating device.

It is also conceivable for coolant of the heating circuit and coolant of the second coolant circuit to be conducted alternately through the heating device in order to be heated up. The fourth and the fifth heating mode are thus implemented in alternation.

In the presence of a heating demand in the vehicle interior compartment, it is basically also possible for heat generated in the store to be used for heating the vehicle interior compartment. For example, heat is generated in the store if the store is subject to intense load. This is the case for example in the event of rapid charging or discharging of the store. The use of heat of the store is performed in a further heating mode, hereinafter referred to as sixth heating mode. In this heating mode, the coolant flowing through the second coolant circuit is conducted through the chiller path. The chiller is also flowed through by the refrigerant. The heat transferred from the store to the coolant is thus transferred to the refrigerant. The refrigerant transfers the heat via the condenser to the coolant of the heating circuit, which is conducted through the heater in order to heat the air to be fed to the vehicle interior compartment. The sixth heating mode may be operated such that heat owing to dehumidification in the evaporator can additionally be used for heating the vehicle interior compartment via the radiator.

It is likewise conceivable that, in the presence of elevated ambient temperatures, for example above 30° C., the measures described in the cooling mode are not sufficient for cooling, in particular the vehicle interior compartment. In such a situation, it is conceivable for the thermal management system to be equipped with a coolant cooler which releases heat from the coolant to the surroundings. Such a coolant cooler is preferably incorporated in the heating circuit, particular preferably upstream of the heating circuit pump and downstream of the heat exchanger.

Here, the heat exchanger and the coolant cooler may be arranged in series in a flow direction of the air flowing through the heat exchanger. A structural-space-saving arrangement of the coolant cooler can be achieved if the coolant cooler is, by contrast to the heat exchanger arranged in the conventional manner in a front-end region of the associated vehicle, arranged in a wheel arch or wheel well of the vehicle.

The thermal management system may also comprise a combustion engine. If the thermal management system is a constituent part of a vehicle, the vehicle may be a so-called hybrid vehicle. It is preferable here if the combustion engine is also connected or connectable in heat-transferring fashion via an associated circuit to at least one of the other circuits, such that the heat generated in the internal combustion engine can be correspondingly used and/or the combustion engine can be heated as required.

For this purpose, the thermal management system preferably has a combustion engine circuit which is fluidically separate from the refrigerant circuit and which serves for the temperature control of the combustion engine. The combustion engine is expediently a constituent part of a combustion engine arrangement which, aside from the combustion engine, may have a fresh-air installation for the supply of fresh air to the combustion engine and/or may have an exhaust-gas installation for the discharge of exhaust gas generated in the combustion engine during operation. A temperature-control medium flows in the combustion engine circuit during operation, wherein the temperature-control medium is conveyed by means of a temperature-control medium pump which is incorporated in the combustion engine circuit. Also incorporated in the combustion engine circuit is a heat exchanger for cooling the temperature-control medium, hereinafter also referred to as temperature-control medium heat exchanger. Furthermore, the combustion engine is, for the temperature control of the combustion engine, connected in heat-transferring fashion to the combustion engine circuit.

Embodiments are preferred in which the combustion engine circuit is also fluidically separate from at least one of the coolant circuits, preferably from the respective coolant circuit, and/or from the heating circuit. The combustion engine circuit is thus hydraulically and fluidically decoupled and separate from the at least one coolant circuit and/or the heating circuit, such that the heat transfer between the combustion engine circuit and the corresponding coolant circuit and/or the heating circuit is simplified, in particular is implemented without or with at least little coordination of the circuits with one another and/or the use of valve devices for the fluidic connection of the different circuits.

The temperature-control medium may in principle be any which is desired. In particular, the temperature-control medium is the coolant, such that the combustion engine circuit may also be referred to as third coolant circuit, which is preferably fluidically separate from the first coolant circuit and/or from the second coolant circuit and/or from the heating circuit.

Embodiments are preferred in which the combustion engine arrangement has an exhaust-gas recirculation cooler which serves for the cooling of exhaust gas to be recirculated from the combustion engine, wherein the exhaust-gas recirculation cooler is likewise incorporated in the combustion engine circuit and thus releases heat to the temperature-control medium during operation. Thus, the waste heat generated in the combustion engine can be transferred in an improved and more efficient manner via the combustion engine circuit to at least one of the other circuits.

Embodiments are particularly preferred in which, in the combustion engine circuit, there is incorporated a heat exchanger which is furthermore incorporated in the heating circuit. Said heat exchanger, hereinafter also referred to as combustion engine heat exchanger, thus serves for the exchange of heat between the combustion engine circuit and the heating circuit or between the temperature-control medium and the coolant circulating in the heating circuit. It is thus possible in a simple and efficient manner for heat to be exchanged between the heating circuit and the combustion engine circuit, in particular transferred from the combustion engine circuit to the heating circuit. The heat thus transferred is used, for example via the radiator, for heating the vehicle interior compartment.

Embodiments are advantageous in which both the heating circuit and the second coolant circuit, preferably the coolant circuit bypass arm, lead through the combustion engine heat exchanger. It is thus possible, via the combustion engine heat exchanger, for heat to be exchanged both between the combustion engine circuit and the second coolant circuit and between the combustion engine circuit and the heating circuit.

The combustion engine heat exchanger may, in principle, be of any desired design. In particular, the combustion engine heat exchanger is a so-called coolant-to-coolant heat exchanger, which is flowed through at one side by the coolant of the heating circuit, and possibly also of the second cooling circuit, and also, preferably in a manner fluidically separate from the coolant, by the temperature-control medium of the combustion engine circuit. Here, both a parallel flow of the combustion engine heat exchanger and an opposing flow and/or a cross-configuration flow or combinations of these may be used.

In preferred embodiments, the combustion engine heat exchanger is incorporated in the heating circuit upstream of the heating device and downstream of the condenser. It is thus possible for coolant circulating through the heating circuit to be preheated by means of the combustion engine heat exchanger before flowing through the heating device, such that the power required by the electric heating device to attain a predefined temperature of the coolant is reduced. Altogether, it is possible in this way for the thermal management system to be operated in a more energy-saving and effective manner. Furthermore, the coolant circulating through the heating circuit is pre-warmed by means of the condenser before entering the combustion engine heat exchanger, such that, if the condenser, the combustion engine heat exchanger and the heating device are flowed through, a three-stage increase of the temperature of the coolant is realized. This, too, leads to more energy-saving and efficient operation of the thermal management system. Altogether, the power required to attain a predefined temperature of the coolant circulating through the heating circuit, and possibly also of the coolant circulating through the second coolant circuit, is minimized or at least reduced. In particular, both the waste heat of the combustion engine via the combustion engine circuit, and the heat absorbed from the refrigerant circuit via the condenser, and possibly also the heat absorbed from the energy store via the second coolant circuit, are used for heating the coolant flowing through the heating circuit and thus in particular also for heating the vehicle interior compartment.

It is also conceivable for the combustion engine heat exchanger to be arranged in the heating circuit downstream of the electric heating device. In this case, the combustion engine heat exchanger is arranged in the heating circuit between the heating device and the radiator, such that the heat transferred to the coolant in the heating circuit by means of the combustion engine heat exchanger passes to the radiator without flowing through the heating device and thus without thermal losses and/or pressure losses upon flowing through the heating device. Such a configuration is advantageous in particular if the heating device is normally not in operation.

The combustion engine heat exchanger is particularly preferably incorporated in the heating circuit heating branch in the heating circuit, preferably upstream of the electric heating device. This means in particular that the combustion engine heat exchanger is arranged directly before the heating device. The thermal efficiency in the heating circuit is thus maximized or at least increased, because heat losses of the coolant circulating through the heating circuit between the combustion engine heat exchanger and the heating device are minimized or at least reduced.

It is likewise conceivable for the combustion engine heat exchanger to be arranged in the heating circuit in the heating circuit bypass branch and outside the heating circuit heating branch.

Preferred embodiments have, in the heating circuit, a heating circuit heat exchanger bypass branch which circumvents the combustion engine heat exchanger, wherein an associated valve device, hereinafter also referred to as combustion engine heat exchanger valve device, conducts the coolant in the heating circuit selectively through the combustion engine heat exchanger and/or through the heating circuit heat exchanger bypass branch. In this way, it is possible in particular for the coolant flowing through the heating circuit to be conducted at least partially past the combustion engine heat exchanger as required, such that corresponding thermal losses and pressure drops that can arise as a result of the flow through the combustion engine heat exchanger are at least reduced.

The system advantageously has a valve device which conducts the coolant downstream of the heating device selectively through the second coolant circuit and/or through the heating circuit and thus selectively recirculates it to the second coolant circuit and/or to the heating circuit. The valve device, hereinafter also referred to as coolant circuit bypass arm valve device, may in this case be designed as a simple, in particular closed-loop-controllable, two-way valve, and thus permits simple guidance and/or division of the coolant between the second coolant circuit and the heating circuit. The coolant circuit bypass arm valve device designed as a two-way valve is preferably arranged downstream of the heating device in the coolant circuit bypass arm and thus makes it possible for the above-stated distribution of the coolant to be realized in a particularly simple manner.

The combustion engine arrangement may have a cooler for cooling the air to be fed to the combustion engine, hereinafter referred to as air cooler. The air cooler is expediently incorporated in the fresh-air installation of the combustion engine arrangement.

The air cooler is advantageously a charge-air cooler which is incorporated in the fresh-air installation downstream of a compressor for compressing the air to be fed to the combustion engine, wherein the compressor may be a constituent part of an exhaust-gas turbocharger which is driven by a turbine wheel of a turbine which is arranged in the exhaust-gas installation.

It is advantageous if the air cooler is furthermore incorporated in the first coolant circuit in a manner fluidically separate from the fresh-air installation, such that an exchange of heat between the air flowing through the fresh-air installation and the coolant circulating through the first coolant circuit is realized by means of the air cooler during operation. It is thus firstly possible for the air that is to be fed to the combustion engine to be cooled, in particular supercooled, in an effective manner. Secondly, the heat that is absorbed from the air to be fed to the combustion engine can be fed to the drive device and/or to the radiator and/or to the store.

For this purpose, the first coolant circuit preferably has a branch associated with the air cooler, hereinafter also referred to as air cooler branch, which circumvents the drive device, preferably also the on-board electronics system, and in which the air cooler is incorporated. The drive device, preferably also the on-board electronics system, is expediently incorporated in the coolant circuit main branch of the first coolant circuit. It is thus possible in particular for the coolant circulating through the first coolant circuit to be conducted selectively via the drive device and/or through the air cooler. Preferably, for this purpose, an associated valve device, hereinafter also referred to as air cooler valve device, is provided, which is designed so as to conduct the coolant in the first coolant circuit selectively via the drive device and/or through the air cooler branch.

The air cooler branch advantageously branches off from the coolant circuit main branch upstream of the drive device, preferably also upstream of the on-board electronics system.

It is preferable if the first coolant pump of the first coolant circuit is arranged upstream of the branching point of the air cooler branch from the coolant circuit main branch and thus both upstream of the drive device and upstream of the air cooler. The pressure loss in the coolant circulating through the first coolant circuit is thus minimized or at least reduced, such that a separate coolant pump for the air cooler branch can be omitted and/or the first coolant pump can be operated with reduced power. An increase in the efficiency of the thermal management system and/or a reduction of the energy requirement is also realized in this way.

The air cooler branch advantageously opens out upstream of the heat exchanger in the coolant circuit main branch. It is conceivable here for the air cooler branch to open out into the coolant circuit main branch directly upstream of the heat exchanger or even upstream of the coolant circuit bypass branch.

It is self-evident that, aside from the thermal management system, a vehicle having an interior compartment and having a thermal management system of said type, and corresponding operating methods for the thermal management system, each fall within the scope of this invention.

Further important features and advantages of the invention will emerge from the subclaims, from the drawings and from the associated description of the figures on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations are used to denote identical or similar or functionally identical components.

DETAILED DESCRIPTION

Figure 1:
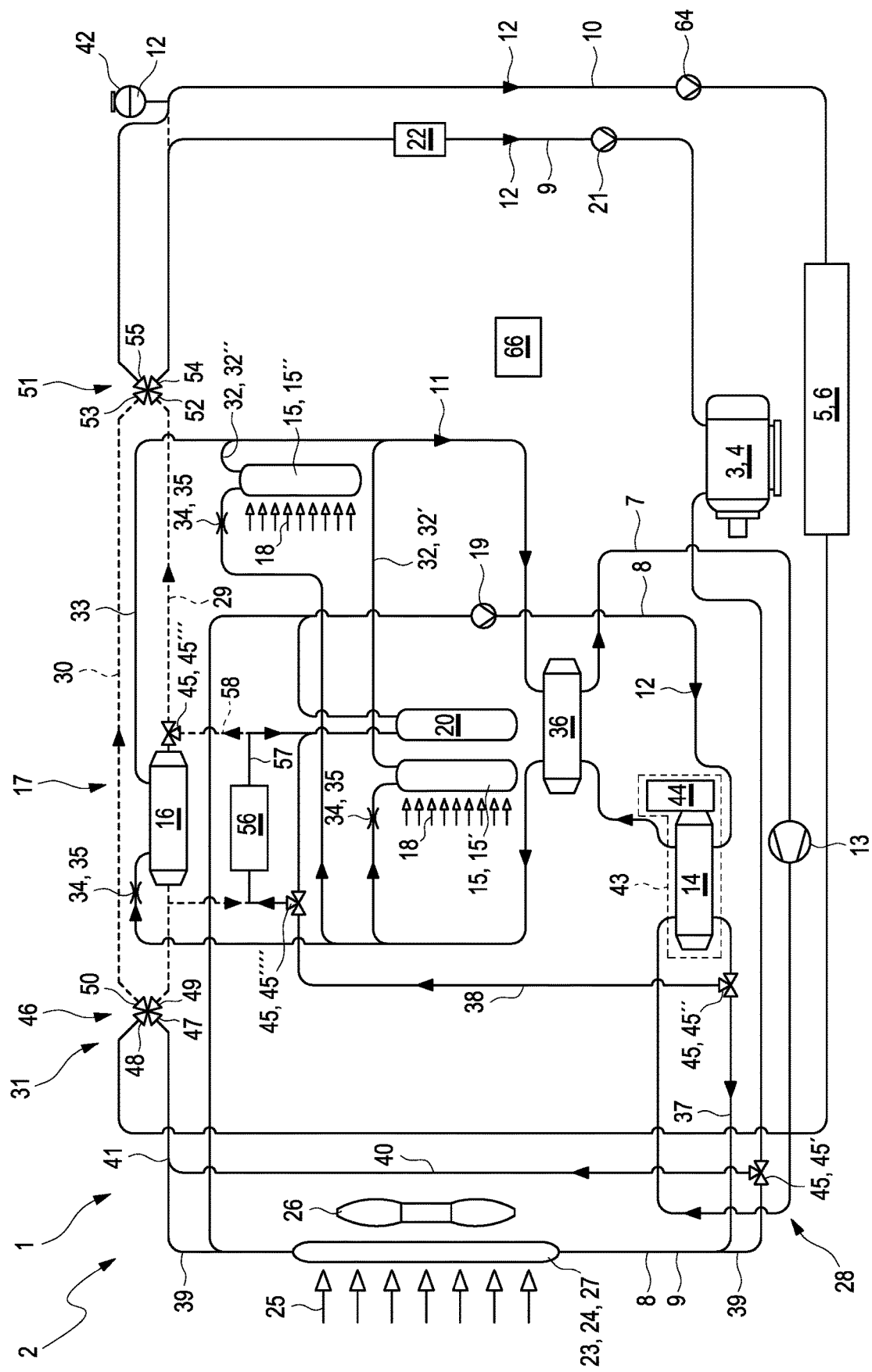
FIG. 1 shows a highly simplified illustration, in the form of a circuit diagram, of a thermal management system of a vehicle.

A thermal management system 1 for a vehicle 2 having an electric drive device 3, for example an electric motor 4, and having an electrical store 5, for example an accumulator 6, for providing a supply of electricity to the drive device 3, as shown by way of example in FIG. 1, has a refrigerant circuit 7, a heating circuit 8, a first coolant circuit 9 and a second coolant circuit 10. A refrigerant 11 circulates in the refrigerant circuit 7 during operation. In each case one coolant 12 circulates in the heating circuit 8 and in the coolant circuits 9, 10 during operation. In the refrigerant circuit 7, there are arranged a refrigerant compressor 13 for compressing the refrigerant 11, a condenser 14 which is arranged downstream of the refrigerant compressor 13 and which serves for condensing the refrigerant 11, and, upstream of the refrigerant compressor 13 and downstream of the condenser 14, at least one evaporator 15 for evaporating the refrigerant 11 and a chiller 16 for transferring heat to the refrigerant 11. The chiller 16 transmits heat from the coolant 12 to the refrigerant 11 during operation. The at least one evaporator 15 serves the purpose of cooling air 18 that is to be fed to a vehicle interior compartment (not shown) of the vehicle 2. For this purpose, the air 18 passes the evaporator 15, which absorbs heat from the air 18 and transfers said heat to the refrigerant 11 flowing through said evaporator. In the example shown, two such evaporators 15, specifically a first evaporator 15' and a second evaporator 15", are incorporated in the refrigerant circuit 7, which evaporators may each be assigned to an associated zone of the vehicle interior compartment. The heating circuit 8 has a heating circuit pump 19 for conveying the coolant 12 in the heating circuit 8, and a radiator 20. Air 18 that is to be fed to the vehicle interior compartment is heated by means of the radiator 20. In the example shown, the radiator 20 is, in the flow direction of the air 18 that is to be fed to the vehicle interior compartment, arranged downstream of the first evaporator 15', such that the air passes firstly the first evaporator 15' and subsequently the radiator 20. The heating circuit 8 and the refrigerant circuit 7 are fluidically separate from one another. Here, the condenser 14 of the refrigerant circuit 7 is also incorporated in the heating circuit 8, downstream of the heating circuit pump 19 there. The condenser 14 transfers heat of the refrigerant 11 flowing through said condenser from the refrigerant circuit 7 to the coolant 12, flowing through said condenser, of the heating circuit 8, and is thus an indirect condenser 14. The first coolant circuit 9 serves for the temperature control, in particular cooling, of the drive device 3. For this purpose, the drive device 3 is connected in heat-transferring fashion to the first coolant circuit 9, in particular is incorporated in the first coolant circuit 9. The first coolant circuit 9 furthermore has a first coolant pump 21 for conveying coolant 12 in the first coolant circuit 9, which pump is arranged upstream of the drive device 3 in the example shown. In the example shown, an on-board electronics system 22 of the vehicle 1 is also temperature-controlled, in particular cooled, by means of the first coolant circuit 9, wherein the on-board electronics system 22 is arranged upstream of the first coolant pump 21. The second coolant circuit 10 serves for the temperature control of the store 5. For this purpose, the store 5 is connected in heat-transferring fashion to the second coolant circuit 10, in particular is incorporated in the second coolant circuit 10. Furthermore, in the second coolant circuit 10, there is incorporated a second coolant pump 64 for conveying the coolant 12 in the second coolant circuit 10, which second coolant pump is arranged upstream of the store 5. The heating circuit 8 and the first coolant circuit 9 have a common heat exchanger 23, which exchange heat with the surroundings of the thermal management system 1. In the example shown, the heat exchanger 23 is a radiator 24, preferably a low-temperature heat exchanger 27, through which air 25 drawn in from the surroundings, for example air 25 drawn in by means of a fan 26, flows. An exchange of heat consequently occurs between the coolant 12 flowing through the heat exchanger 23 and the air 25. In the example shown, the heating circuit 8 and the first coolant circuit 9 are conducted fluidically jointly through the common heat exchanger 23. A valve device 28, hereinafter referred to as heat exchanger valve device 28, ensures that the heat exchanger 23 is flowed through selectively by the coolant 12 from the heating circuit 8 and/or from the first coolant circuit 9 during operation. It is likewise possible for any desired fraction of the coolant 12 from the heating circuit 8 and/or the first coolant circuit 9 to be conducted past the heat exchanger 23, and for the latter to thus be circumvented.

With the chiller 16 incorporated in the refrigerant circuit 7, it is possible for heat to be transferred from the coolant 12 to the refrigerant 11. For this purpose, the chiller 16 can be flowed through by the coolant 12 from the first coolant circuit 9 and/or by the coolant 12 from the second coolant circuit 10. To permit this, the thermal management system 1 has a chiller guide 17 which is fluidically separate from the refrigerant circuit 7 and which has a chiller path 29 which is fluidically separate from the refrigerant circuit 7 and in which the chiller 16 is incorporated. Furthermore, the chiller guide 17 has a bypass path 30 which is fluidically separate from the refrigerant circuit 7 and which circumvents the chiller 16. The chiller path 29 and bypass path 30 are, upstream of the chiller 16 and downstream of the chiller 16, in each case fluidically connectable to the first coolant circuit 9 or to the second coolant circuit 10, and are each illustrated by dashed lines in FIG. 1. For the fluid connection of the chiller path 29 and of the bypass path 30 to the respective coolant circuit 9, 10, the thermal management system 1 has a valve device 31, which will hereinafter be referred to as chiller valve device 31.

In the example shown, the refrigerant circuit 7 has, for the respective evaporator 15 and the chiller 16, different circuit branches 32, 33 which run parallel to one another. Here, the respective evaporator 15 is incorporated in an associated evaporator branch 32, and the chiller 16 is incorporated in a chiller branch 33 of the refrigerant circuit 7. The refrigerant circuit 7 of the example shown thus has a chiller branch 33 in which the chiller 16 is incorporated. Furthermore, the refrigerant circuit 7 has a first evaporator branch 32', in which the first evaporator 15' is incorporated, and a second evaporator branch 32", in which the second evaporator 15" is incorporated. The chiller 16 and the respective evaporator 15 are assigned, in the associated branch 32, 33, a throttle device 34 which controls, in closed-loop fashion, the flow of refrigerant 11 through the associated evaporator 15 and the chiller 16. In the example shown, the throttle devices 34 are arranged in the evaporator branch 32 of the associated evaporator 15 and upstream of the evaporator 15. Also, the throttle device 34 of the chiller 16 is arranged in the chiller branch 33 upstream of the chiller 16. The respective throttle device 34 may have an expansion valve 35 or be designed as such an expansion valve 35. The refrigerant circuit 7 of the example shown furthermore has an internal heat exchanger 36. The internal heat exchanger 36 is incorporated in the refrigerant circuit 7 on the one hand upstream of the refrigerant compressor 13 and downstream of the chiller 16 or the evaporator 15 and on the other hand downstream of the condenser 14, such that the internal heat exchanger 36 can dissipate heat from the refrigerant 11 downstream of the condenser 14.

The heating circuit 8 of the example shown has a main branch 37, hereinafter referred to as heating circuit main branch 37, which leads through the heat exchanger 23. The heating circuit 8 furthermore has a bypass branch 38, hereinafter also referred to as heating circuit bypass branch 38, which runs parallel to the heating circuit main branch 37 and which circumvents the heat exchanger 23. Here, the radiator 20 is incorporated in the heating circuit bypass branch 38. The first coolant circuit 9 of the example shown has a main branch 39, hereinafter also referred to as coolant circuit main branch 39, which leads through the heat exchanger 23. The first coolant circuit 9 furthermore has a bypass branch 40, hereinafter also referred to as coolant circuit bypass branch 40, which runs parallel to the coolant circuit main branch 39 and which circumvents the heat exchanger 23 and which opens out into the coolant circuit main branch 39 downstream of the heat exchanger 23 at an opening-out point 41.

In the example shown, the thermal management system 1 has a coolant vessel 42. The coolant vessel 42 may directly feed coolant 12 to, or discharge coolant 12 from, the first coolant circuit 9 and/or the second coolant circuit 10. The condenser 14 of the refrigerant circuit 7 in the example is a constituent part of a condenser module 43 which also has a collector 44 for collecting precipitated refrigerant 11.

The heat exchanger valve device 28 of the example shown has, for the heating circuit 8 and the first coolant circuit 9, in each case one three-way valve 45, by means of which the flow of the coolant 12 can be divided up and adjusted as desired between the associated main branch 37, 39 and bypass branch 38, 40. The three-way valve 45 of the first coolant circuit 9 will hereinafter also be referred to as first cooling circuit valve 45'. The three-way valve 45 of the heating circuit 8 will hereinafter also be referred to as heating circuit valve 45".

The chiller valve device 31 of the example shown has a first four-way valve 46 arranged upstream of the chiller 16. The first four-way valve 46 has a first inlet 47, into which the first coolant circuit 9 opens downstream of the opening-out point 41, and a second inlet 48, into which the second coolant circuit 10 opens out. The first four-way valve 46 furthermore has a first outlet 49, which is fluidically connected to the chiller path 29, and a second outlet 50, which is fluidically connected to the bypass path 30. Here, the four-way valve 46 may fluidically connect the respective inlet 47, 48 to the respective outlet 49, 50, such that the chiller path 29 is flowed through selectively by the coolant 12 originating from the first coolant circuit 9 or coolant 12 originating from the second coolant circuit 10. Downstream of the chiller 16, the chiller valve device 31 of the example shown has a second four-way valve 51. The second four-way valve 51 has a first inlet 52, into which the chiller path 29 opens out, and a second inlet 53, into which the bypass path 30 opens out. The second four-way valve 51 furthermore has a first outlet 54, which is fluidically connected to the first coolant circuit 9, and a second outlet 55, which is fluidically connected to the second coolant circuit 10. The second four-way valve 51 may fluidically connect each of the inlets 52, 53 to one of the outlets 54, 55.

In the example shown, the thermal management system 1 furthermore has an electric heating device 56, by means of which coolant 12 can be heated. The heating device 56 is incorporated in a heating circuit main branch 57, which is parallel to the heating circuit bypass branch 38, of the heating circuit 8. A three-way valve 45 which is arranged in the heating circuit bypass branch 38, and which is hereinafter also referred to as heating branch valve 45"", controls, in closed-loop fashion, the flow through the heating device 56 and past the heating device 56 of the coolant 12 flowing through the heating circuit. The heating device 56 is furthermore arranged in a secondary branch 58, which circumvents the chiller 16, of the bypass path 29, such that coolant 12 flowing through the bypass path 29 can be heated by means of the heating device 56. The flow of coolant 12 via the secondary branch 58 is adjusted by means of a three-way valve 45, which will hereinafter also be referred to as heating device valve 45′″ and which, in the example shown, is arranged downstream of the chiller 16 in the bypass path 29.

Figure 2:
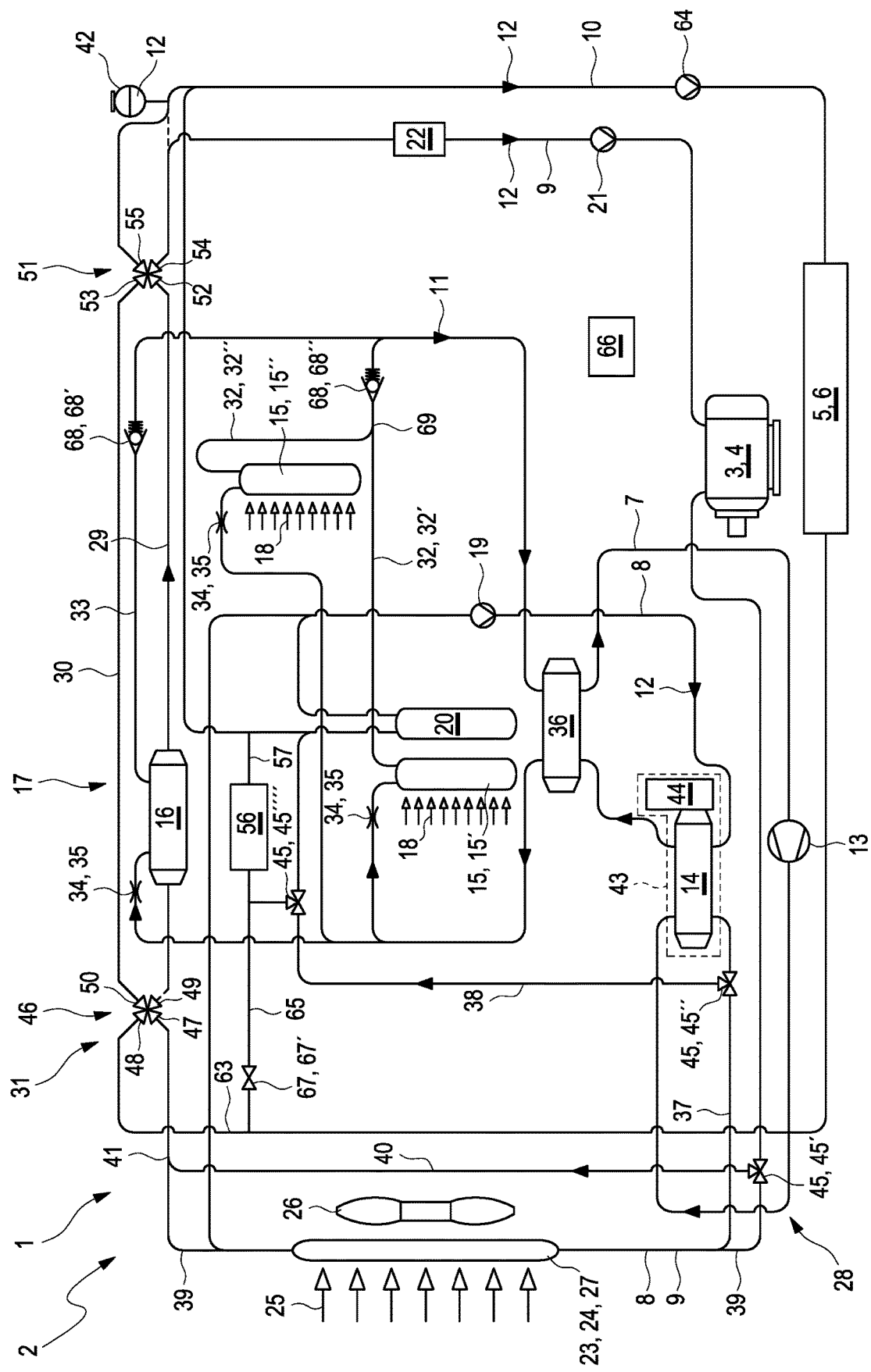
FIG. 2 shows a highly simplified illustration, in the form of a circuit diagram, of the thermal management system from FIG. 1 in another exemplary embodiment.

FIG. 2 shows another exemplary embodiment of the thermal management system 1, wherein it is assumed merely by way of example that the chiller path 29 is fluidically connected, upstream and downstream of the chiller 16, to the first coolant circuit 9 and the bypass path 30 is fluidically connected, upstream and downstream of the chiller 16, to the second coolant circuit 10. This example differs from the example shown in FIG. 1 in that the second coolant circuit 10 has two branches 63, 65 running parallel, which will hereinafter be referred to as coolant circuit main arm 63 and coolant circuit bypass arm 65. Here, the coolant circuit main arm 63 leads through the chiller guide 17, whereas the coolant circuit bypass arm 65 circumvents the chiller guide 17. The coolant 12 flowing through the second coolant circuit 10 is thus conducted so as to flow through the chiller guide 17, that is to say the chiller path 29 and/or the bypass path 30, through the coolant circuit main arm 63 and, so as to at least partially or proportionately circumvent the chiller guide 17, through the coolant circuit bypass arm 65. For this purpose, the second coolant circuit 10 is equipped with a valve 67, which will hereinafter be referred to as coolant valve 67 and which may be designed as a simple shut-off valve 67′ and which, in the example shown, is arranged in the coolant circuit bypass arm 65. The coolant valve 67 is designed such that it can divide up the coolant 12 flowing through the second coolant circuit 10 as desired between the coolant circuit main arm 63 and the coolant circuit bypass arm 65. In the example shown, the coolant circuit bypass arm 65 leads through the heating device 56. A further difference in relation to the example of FIG. 1 consists in that the heating device valve 45′″ and the secondary branch 58 are omitted. In this example, the heating device 45′″ is thus replaced by the simpler coolant valve 67. Furthermore, in the chiller branch 33 of the refrigeration circuit 7, downstream of the chiller 16, there is arranged a check valve 68, hereinafter referred to as chiller check valve 68′, which prevents a flow of refrigerant 11 in the direction of the chiller 16. A further check valve 68 in the refrigerant circuit 7, hereinafter referred to as evaporator check valve 68″, prevents the flow of refrigerant 11 from the chiller 16 in the direction of the at least one evaporator 15, circumventing the refrigerant compressor 13 and/or condenser 14. In the example shown, a common evaporator check valve 68″ prevents such a flow to both evaporators 15. For this purpose, the second evaporator branch 32″ opens out, downstream of the second evaporator 15″, into an evaporator opening-out point 69 of the first evaporator branch 32′, which is arranged downstream of the first evaporator 15′. The evaporator check valve 68″ is arranged in the first evaporator branch 32′ downstream of the evaporator opening-out point 69.

The respective thermal management system 1 can be operated in numerous operating modes. A selection of these operating modes will be discussed on the basis of FIGS. 3 to 5, wherein, for this purpose, the thermal management system 1 from FIG. 1 will be considered merely by way of example. It is however self-evident that the respective operating mode may also be implemented with the thermal management system 1 from FIG. 2 and FIGS. 6 to 12 described below, unless stated otherwise.

Figure 3:
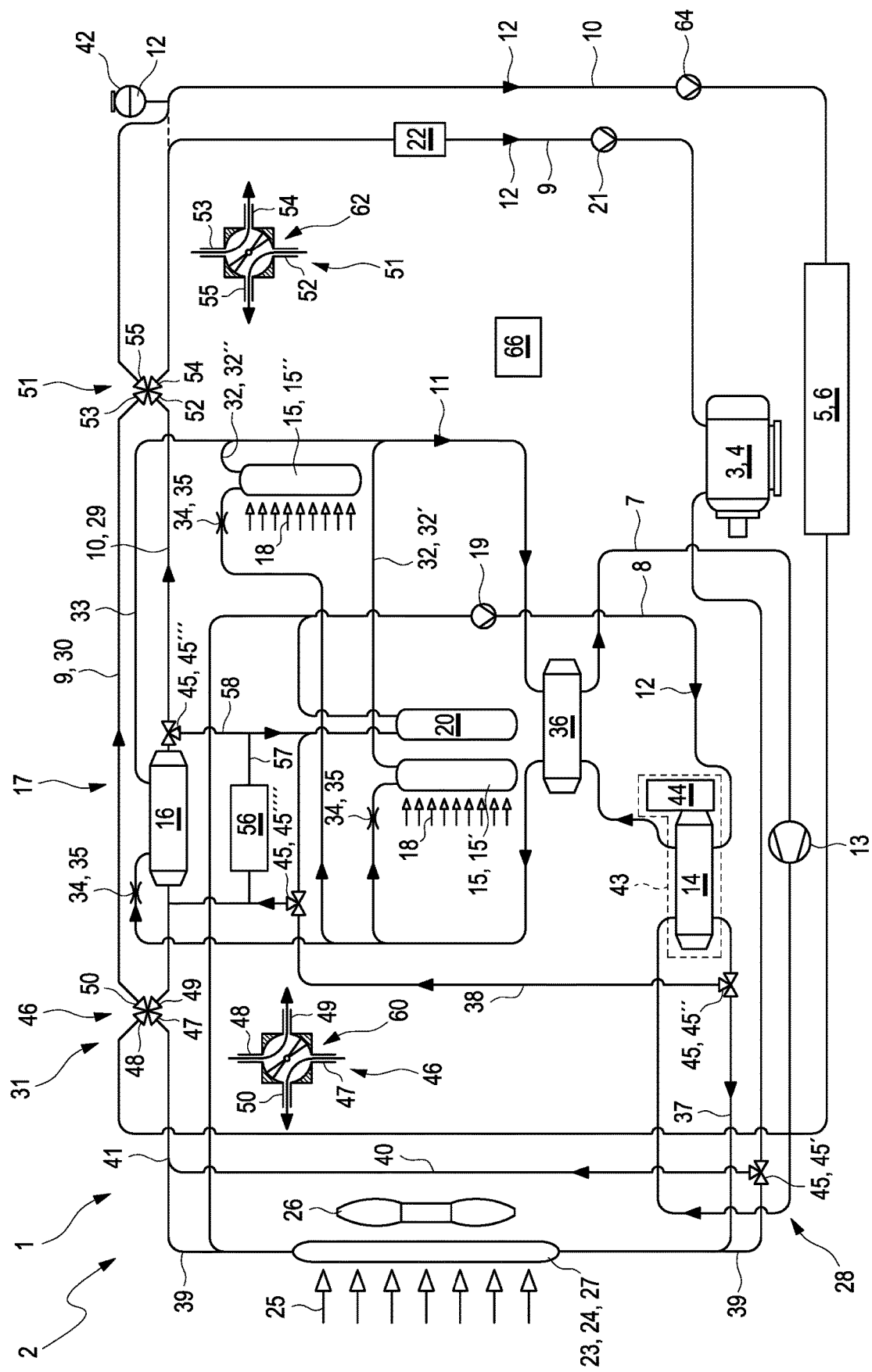
FIG. 3 through FIG. 5 show the thermal management system from FIG. 1 in different operating modes, FIG. 6 through FIG. 12 each show a highly simplified illustration, in the form of a circuit diagram, of the thermal management system in a different exemplary embodiment in each case.
Figure 4:
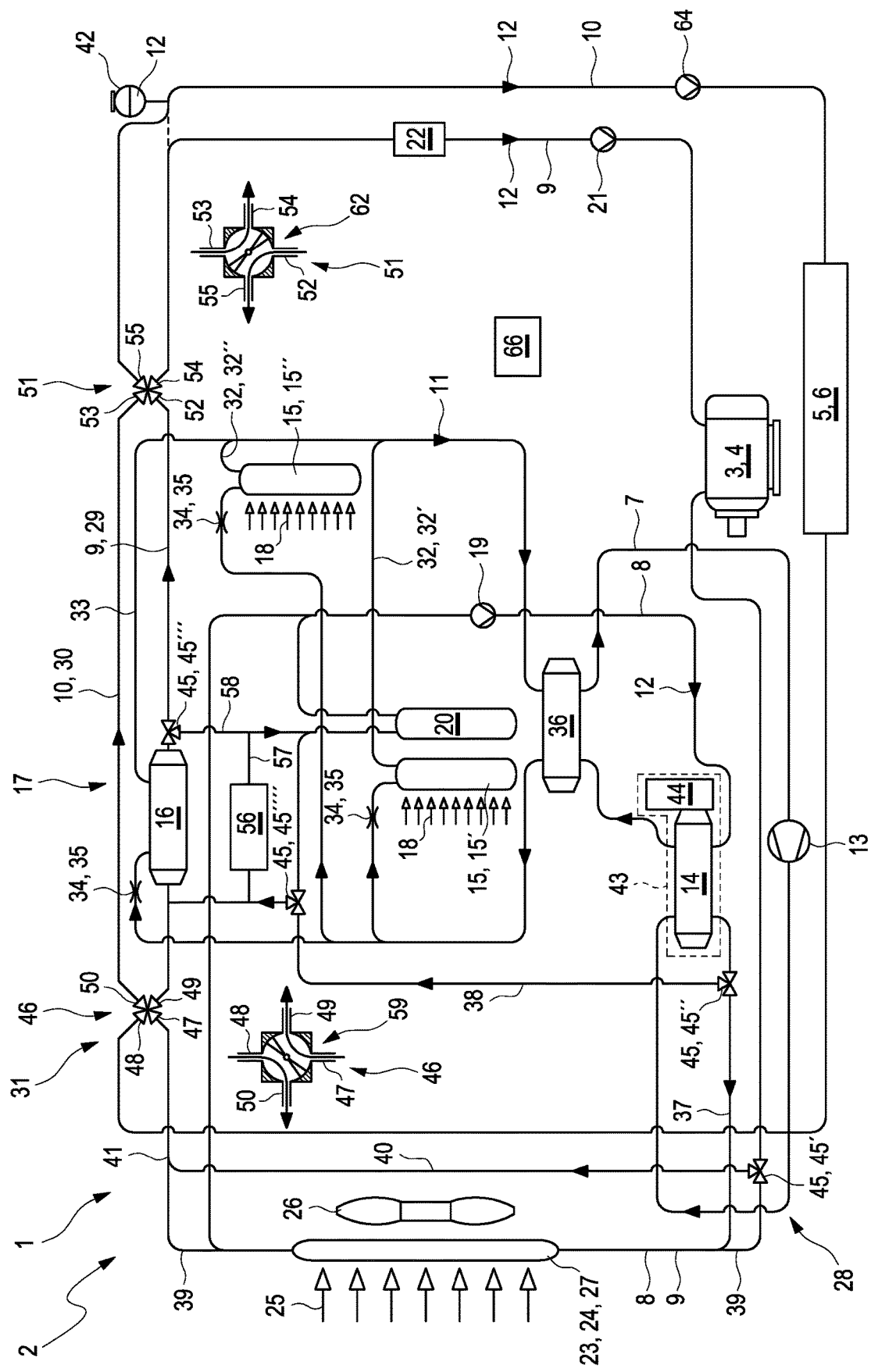
Figure 5:
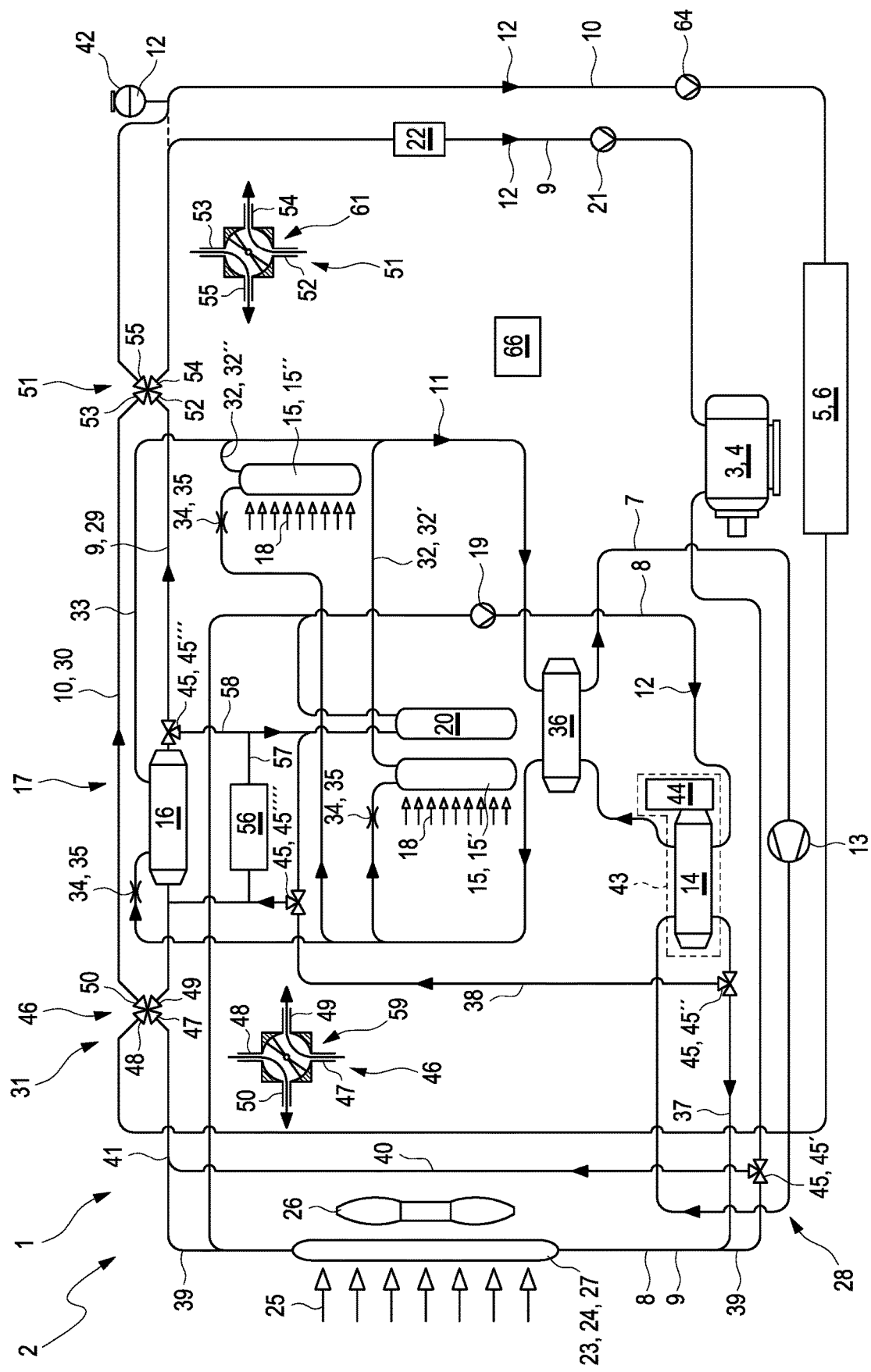

The respective four-way valve 46, 51 of the chiller valve device 31 is also illustrated separately in FIGS. 3 to 5. FIG. 4 shows, for example, a first position 59 of the first four-way valve 46, in which the four-way valve 46 fluidically connects the first inlet 47 to the first outlet 49 and fluidically connects the second inlet 48 to the second outlet 50. Thus, upstream of the chiller 16, the first coolant circuit 9 is fluidically connected to the chiller path 29, such that the chiller path 29, in the first position 59 of the first four-way valve 46, forms a constituent part of the first coolant circuit 9. By contrast, the second coolant circuit 10 is, upstream of the chiller 16, fluidically connected to the bypass path 30, such that the bypass path 30 forms a constituent part of the second coolant circuit 10 in the first position 59 of the first four-way valve 46. By contrast, FIG. 3 shows a second position 60 of the first four-way valve 46, in which the first four-way valve 46 fluidically connects the first inlet 47 to the second outlet 50 and fluidically connects the second inlet 48 to the first outlet 49. Thus, upstream of the chiller 16, a fluidic connection is produced between the second coolant circuit 10 and the chiller path 29, on the one hand, and between the first coolant circuit 9 and the bypass path 30, on the other hand. Thus, in the second position 60 of the first four-way valve 46, the chiller path 29 forms a part of the second coolant circuit 10, whereas the bypass path 30 forms a part of the first coolant circuit 9. FIG. 5 shows the second four-way valve 51 in a first position 61, in which the second four-way valve 51 fluidically connects the first inlet 52 to the first outlet 54 and the second inlet 53 to the second outlet 55. In the first position 61 of the second four-way valve 51, the second four-way valve 51 thus produces, downstream of the chiller 16, a fluidic connection between the chiller path 29 and the first coolant circuit 9, on the one hand, and a fluidic connection between the bypass path 30 and the second coolant circuit 10, on the other hand. FIGS. 3 and 4 show a second position 62 of the second four-way valve 51, in which the second four-way valve 51 fluidically connects the first inlet 52 to the second outlet 55, on the one hand, and the second inlet 53 to the first outlet 54, on the other hand. In the second position 62 of the second four-way valve 51, the second four-way valve 51 thus produces, downstream of the chiller 16, a fluidic connection between the chiller path 29 and the second coolant circuit 10, on the one hand, and between the bypass path 30 and the first coolant circuit 9, on the other hand.

The thermal management system 1 has a control device for operating the thermal management system 1. The control device 66 is in particular correspondingly connected to the valve devices 28, 31, the three-way valves 45, the coolant valve 67 and the throttle devices 34. Furthermore, the control device may be connected in communicating fashion to sensors (not illustrated) of the thermal management system 1 and/or of the vehicle 2, in particular temperature sensors.

FIG. 3 shows a first operating mode of the thermal management system 1. In this operating mode, hereinafter referred to as first cooling mode, the first four-way valve 46 has been adjusted into the second position 60, whereas the second four-way valve 51 has been adjusted into the second position 62. The chiller path 29 is thus fluidically connected, upstream and downstream of the chiller 16, to the second coolant circuit 10, whereas the bypass path 30 is fluidically connected, upstream and downstream of the chiller 16, to the first coolant circuit 9. The flow of the coolant 12 through the first coolant circuit 9 is thus separate from the flow of the coolant 12 through the second coolant circuit 10. Here, the coolant 12 flowing through the second coolant circuit 10 is conducted via the chiller path 29 through the chiller 16 and thus releases heat to the refrigerant 11 of the refrigerant circuit 7, wherein said heat, together with the heat released via the respective evaporator 15 to the refrigerant 11, is released via the condenser 14 to the coolant 12 in the heating circuit 8. In the first cooling mode, the three-way valves 45 in the heating circuit 8 are adjusted such that all of the coolant 12 flowing through the heating circuit 8 flows via the heat exchanger 23 and is thus cooled in the heat exchanger 23. Furthermore, the three-way valves 45 of the heating circuit 8 are set such that no coolant 12 flows to the radiator 20. Thus, in the first cooling mode, cooling of the store 5 and of the vehicle interior compartment is realized by means of the evaporator 15 and the chiller 16. The three-way valve 45 in the first coolant circuit 9 is furthermore set such that the coolant 12 flowing through the first coolant circuit 9 flows at least partially, preferably entirely, through the heat exchanger 23 and is cooled there. Cooling of the drive device 3 and of the on-board electronics system 22 is thus also realized. In the first cooling mode, it is thus assumed that both the drive device 3 and the store 5 and the vehicle interior compartment require cooling. Accordingly, a flow of coolant 12 through the heating device 56 is shut off. The heating device 56 is not in operation in the cooling mode. The first cooling mode illustrated in FIG. 3 is used in particular in the presence of elevated ambient temperatures, in particular in the presence of temperatures above 30° C.

FIG. 4 indicates a further operating mode of the thermal management system 1, which will hereinafter be referred to as second cooling mode. In this mode, the first four-way valve 46 has been adjusted into the first position 59, whereas the second four-way valve 51 has been adjusted into the second position 62. This means that the coolant 12 flowing through the first coolant circuit 9 is fed to the chiller path 29 upstream of the chiller 16, such that the chiller path 29 forms a part of the first coolant circuit 9. Via the second four-way valve 62, the chiller path 29 is connected to the second coolant circuit 10, such that coolant 12 originating from the first coolant circuit 9 downstream of the chiller 16 is fed to the second coolant circuit 10 downstream of the chiller 16. Coolant 12 originating from the second coolant circuit 10 upstream of the chiller 16 is conducted via the bypass path 30 past the chiller 16, such that the bypass path 30 forms a constituent part of the second coolant circuit 10. Downstream of the chiller 16, the coolant 12 originating from the second coolant circuit 10 is fed to the first coolant circuit 9. In the second cooling mode shown, the coolant 12 thus absorbs heat, in the first coolant circuit 9, from the drive device 3 and the power electronics system 22 and, in the second coolant circuit 10, from the store 5. Subsequently, via the first coolant circuit 9, said heat is released via the heat exchanger 23 to the surroundings. Here, a flow of the refrigerant 11 through the chiller 16 is shut off, such that the chiller 16 is in a passive state or passive mode, in which no heat or a considerably reduced amount of heat is exchanged between the coolant 12 and the refrigerant 11 in the chiller 16. The second cooling mode is expedient in particular if the thermal conditions in the surroundings of the thermal management system 1 or of the vehicle 2 are such that temperature control of the vehicle interior compartment is not to be performed, or is to be performed only to a reduced extent.

This is the case in particular in the presence of moderate ambient temperatures, for example between 15 and 20° C. Furthermore, the second cooling mode is expedient if the drive device 3 generates a small amount of heat and thus requires no cooling or reduced cooling. In the second cooling mode, the flow of the refrigerant 11 through the evaporator 15, too, may be shut off or at least reduced. In particular, it is possible for the refrigerant compressor 13 to be placed into a non-operational state. The second cooling mode is in particular also advantageous when the electrical store 5 is being charged below moderate ambient temperatures, for example below 20° C. Since the chiller 16 is not in operation or is in the passive mode, the thermal management system 1 consumes a reduced amount of energy in the second cooling mode.

In a further operating mode, hereinafter referred to as third cooling mode, the flow of refrigerant 11 through the at least one evaporator 15 is shut off, as per FIG. 3 and in addition to the measures in the first cooling mode. The at least one evaporator 15 is thus passive, and does not cool the air 18. The thermal management system 1 thus consumes even less energy. The third cooling mode is expedient in particular if there is a cooling demand exclusively at the store 5. This is the case for example when the store 5 is being charged when the vehicle 2 is not in operation and/or when the vehicle 1 is unoccupied.

Further operating modes of the thermal management system 1 will be discussed with FIG. 5. These operating modes are used in particular in the case of heating, or when there is a heating demand. In a first heating mode, the first four-way valve 46 has been adjusted into the first position 59 and the second four-way valve 51 has been adjusted into the first position 61. The chiller path 29 thus forms a part of the first coolant circuit 9, wherein the chiller path 29 is again connected via the second four-way valve 51 to the first coolant circuit 9, such that a separate flow of the coolant in the two coolant circuits 9, 10 is realized. Here, the coolant 12 flowing through the first coolant circuit 9 is conducted through the chiller 16, which is in the passive mode and which is thus not flowed through by the refrigerant 11. By contrast, the evaporators 15, in particular the first evaporator 15, are flowed through by the refrigerant 11. Dehumidification of the air 18 is performed in the respective evaporator 15 by virtue of the moisture in the air 18 being condensed. The heat that is generated as a result is fed to the refrigerant 11 and subsequently via the condenser 14 to the coolant 12 in the heating circuit 8. The refrigerant compressor 13 also adds heat energy to the refrigerant 11, which heat energy is extracted from the refrigerant 11 in the condenser 14 and is fed to the coolant 12 in the heating circuit 8. Said heat is fed via the heating circuit 8 to the radiator 20, in order to heat the previously dehumidified air 18 and feed said heat to the vehicle interior compartment. The greater the fraction of the coolant flowing through the heating circuit bypass 38 to the radiator 20, the more heat can be released to the air 18 that is to be fed to the vehicle interior compartment. Cooling of the drive device 3 and of the on-board electronics system 22 is performed by virtue of the coolant 12 that flows through the first coolant circuit 9 absorbing heat from the drive device 3 and the on-board electronics system 22 and releasing said heat via the heat exchanger 23 to the surroundings or to the air 25.

In the case of high levels of humidity in the air 18 that is to be fed to the vehicle interior compartment and moderate temperatures of approximately 5° C. to 20° C., an increased amount of heat is generated in the respective evaporator 15 during the dehumidification of the air, which may exceed the heating demand by the radiator 20. In this case, it is possible for a part of the coolant 12 to be cooled in the heating circuit 8 by means of the heat exchanger 23.

If the heating demand increases further, for example if the ambient temperatures or outside temperatures fall further, for example below 5° C., the thermal management system 1 is operated in a second heating mode. The second heating mode differs from the first heating mode in that the chiller 16 is used no longer passively but rather actively. The chiller 16 is thus flowed through by the refrigerant 11, such that heat previously obtained from the drive device 3 and the on-board electronics system 22 and transferred to the coolant 12 of the first coolant circuit 9 is transferred, in the chiller 16, to the refrigerant 11, which is thus at an elevated temperature and consequently transfers more heat via the condenser 14 to the coolant 12 flowing through the heating circuit 8. Thus, more heat is transferred to the air 18 via the radiator 20. Said transferred heat may be increased by virtue of the coolant 12 in the heating circuit 8 and/or in the first coolant circuit 9 being conducted in each case via the associated bypass branch 38, 40 past the heat exchanger 23, such that said coolant releases no heat in the heat exchanger 23.

If the coolant 12 in the first coolant circuit 9 has a lower temperature at the outlet of the drive device 3 than the temperature in the surroundings of the heat exchanger 23, it is possible in a third heating mode for the coolant 12 flowing through the first coolant circuit 9 to be conducted through the heat exchanger 23 in order to absorb heat from the surroundings there.

In the presence of a further increasing heating demand, the electric heating device 56 may be used in a fourth heating mode. This is generally the case in the presence of temperatures below freezing, in particular below −5° C. Here, the electric heating device 56 is used so as to assist the above-described measures in order to keep the energy demand of the heating device 56 or of the thermal management system 1 as low as possible. For example, by means of a corresponding adjustment of the heating device valve 45'''' in the heating circuit bypass branch 38, a part of the coolant 12 is conducted through the heating device 56 and is subsequently fed to the radiator 20.

In the heating modes, the temperature control of the store 5 may generally be deactivated. Should there nevertheless be a demand for heating the store 5, it is possible, in a fifth heating mode, for a part of the coolant 12 from the second coolant circuit 10 to be conducted through the heating device 56 in order to heat the store 5. The fourth and fifth heating modes may be implemented in alternation. It is also possible for the fourth and fifth heating modes to be implemented simultaneously, in particular with the thermal management system 1 of FIG. 2.

Heat may be generated in the store 5, which heat may also be used, as required, for the heating of the vehicle interior compartment. In a corresponding sixth heating mode, the coolant 12 flowing through the second coolant circuit 10 is conducted through the chiller path 29 in order to release heat there to the refrigerant 11 flowing through the chiller 16. Thus, the heat transferred from the store 5 to the coolant 12 is transferred to the refrigerant 11. Said heat is fed via the condenser 14 to the heating circuit 8 and subsequently to the radiator 20, in order to heat the air 18 that is to be fed to the vehicle interior compartment. The sixth heating mode may be operated such that heat resulting from dehumidification in the evaporator 15 can additionally be used for heating the vehicle interior compartment via the radiator 20.

The valves 45, 46, 51, 67 and thus also the valve devices 28, 31 and also the throttle devices 34 of the thermal management system 1 are each variably adjustable, such that they each allow the flow of coolant 12 or refrigerant 11 to be divided up and/or limited as desired. Exemplary settings will be discussed below on the basis of the heating circuit valve 45'' and the cooling circuit valve 45' of the first coolant circuit 9.

For example, the heating circuit valve 45'' and the cooling circuit valve 45' are, in the third cooling mode, preferably set such that all of the coolant 12 in the heating circuit 8 is conducted through the heating circuit main branch 37, whereas all of the coolant 12 in the first coolant circuit 9 is conducted through the coolant circuit bypass branch 40. Thus, the heat exchanger 23 is available only to the heating circuit 8, such that relatively intense cooling of the coolant 12 in the heating circuit 8 occurs. The store 5 can thus ultimately be subjected to relatively intense cooling. This is expedient in particular when the store 5 is being charged in the presence of high ambient temperatures.

In the first and/or third heating mode, the heating circuit valve 45'' and the cooling circuit valve 45' are preferably set such that all of the coolant 12 flowing through the first coolant circuit 9 flows through the coolant circuit main branch 39 and all of the coolant 12 flowing through the heating circuit 8 flows through the heating circuit bypass branch 38. Thus, the heat exchanger 23 is available only to the first coolant circuit 9 for the exchange of heat with the surroundings, in particular the air 25. Furthermore, heat transferred via the condenser 14 to the coolant 12 is fed, without an exchange of heat in the heat exchanger 23, to the radiator 20. In the first heating mode, this is expedient in particular if there is a low demand for heating of the air 18 after the dehumidification of the air 18 that is to be fed to the vehicle interior compartment in the evaporator 15. In the third heating mode, a greater transfer of heat to the coolant 12 is thus performed in the heat exchanger 23.

In the first cooling mode, the heating circuit valve 45'' and the cooling circuit valve 45' are each set such that all of the coolant 12 flowing through the first coolant circuit 9 flows through the coolant circuit main branch 39 and all of the coolant 12 flowing through the heating circuit 8 flows through the heating circuit main branch 37. Thus, all of the coolant 12 from the first coolant circuit 9 and the heating circuit 8 flows through the heat exchanger 23 and is cooled there. This is expedient in particular if there is simultaneously a high cooling demand of the refrigerant circuit 7 and thus of the vehicle interior compartment and of the store 5 and also of the drive device 3.

It is also conceivable for the heating circuit valve 45'' and the cooling circuit valve 45' to be set such that all of the coolant 12 flowing through the first coolant circuit 9 flows through the coolant circuit bypass branch 40 and all of the coolant 12 flowing through the heating circuit 8 flows through the heating circuit bypass branch 38. Thus, no heat transfer takes place between the surroundings and the coolant 12 via the heat exchanger 23. Furthermore, the first coolant circuit 9 and the heating circuit 8 are fluidically separate. This is expedient in particular in the second heating mode. Thus, coolant 12 of the first coolant circuit 9 releases heat originating from the drive device 3 and from the on-board electronics system 22 at the chiller 16 to the refrigerant 11. Via the condenser 14, the refrigerant 11 transfers said heat to the coolant 12 in the heating circuit 8, which finally feeds the heat to the radiator 20 in order to heat the air 18 that is to be fed to the vehicle interior compartment.

Settings of the cooling circuit valve 45' are also possible in which one part of the coolant 12 flowing through the first coolant circuit 9 flows through the coolant circuit bypass branch 40 and another part flows through the coolant circuit main branch 39. Settings of the heating circuit valve 45'' are also possible in which one part of the coolant 12 flowing through the heating circuit 8 flows through the heating circuit bypass branch 38 and another part flows through the heating circuit main branch 37.

In particular in the heating modes, it is thus possible for the heating circuit 8 to be used in accordance with demand. For example, if the heat that is transferred to the coolant 12 of the heating circuit 8 at the condenser 14, in particular owing to the operation of the refrigeration circuit 7, exceeds the heating demand of the radiator 20 and thus the heating demand in the vehicle interior compartment, it is possible, in particular on the basis of the first heating modes, by virtue of a part of the coolant 12 from the heating circuit 8 being conducted through the heating circuit main branch 37, for excess heat to be dissipated to the surroundings via the heat exchanger 23.

As stated above, the operating modes described above may also be implemented analogously with the exemplary embodiments of the thermal management system 1 in FIGS. 6 to 12. The exemplary embodiments shown in FIGS. 6 to 12 differ from the exemplary embodiment shown in FIG. 2 in particular by the fact that only one evaporator 15, 15' is incorporated in the refrigerant circuit 7.

In the exemplary embodiments of FIGS. 6 to 12, an exchange of heat with a combustion engine arrangement 70 is additionally possible. The combustion engine arrangement 70 has a combustion engine 71, which is a constituent part of the thermal management system 1, such that the associated vehicle 2 may be a hybrid vehicle 72 with the combustion engine 71 and the electric drive device 3, in particular the electric motor 4. For the exchange of heat with the combustion engine 71, the thermal management system 1 has a combustion engine circuit 73, in which a temperature-control medium 74 circulates during operation. The temperature-control medium 74 may in particular be the coolant 12. The combustion engine circuit 73 is fluidically separate from the refrigerant circuit 7. In the example shown, the combustion engine circuit 73 is furthermore fluidically separate from the heating circuit 8, the first coolant circuit 9 and the second coolant circuit 10. The combustion engine circuit 73 has a temperature-control medium pump 75 which is incorporated in the combustion engine circuit 73 and which serves for conveying the temperature-control medium 74 through the combustion engine circuit 73 and through a heat exchanger 76, hereinafter also referred to as temperature-control medium heat exchanger 76, which is incorporated in the combustion engine circuit 73 and which cools the temperature-control medium 74 during operation. The temperature-control medium heat exchanger 76 may, similarly to the heat exchanger 23 of the first coolant circuit 9 and of the heating circuit 8, be an air-cooled heat exchanger 76. The temperature-control medium heat exchanger 76 may, in the flow direction of the air 25, be arranged between the heat exchanger 23 and the fan 26, such that air 25 conveyed by means of the fan 26 flows firstly through the heat exchanger 23 and subsequently through the temperature-control medium heat exchanger 76. The combustion engine 71 is connected in heat-transferring fashion to the combustion engine circuit 73, such that the combustion engine 71 exchanges heat with the temperature-control medium 74 during operation, and in particular, the heat generated during the operation of the combustion engine 71 is transferred to the temperature-control medium 74 during operation. In the combustion engine circuit 73, the combustion engine 73 is arranged downstream of the temperature-control medium pump 75 and the temperature-control medium heat exchanger 76 is arranged downstream of the combustion engine 73 and upstream of the temperature-control medium pump 75.

A further constituent part of the combustion engine circuit 73 is a heat exchanger 77 for exchanging heat with the heating circuit 8, wherein said heat exchanger 77 will hereinafter also be referred to as combustion engine heat exchanger 77. The combustion engine heat exchanger 77 is incorporated on the one hand in the combustion engine circuit 73 and on the other hand, in a manner fluidically separate from the combustion engine circuit 73, in the heating circuit 8, such that, by means of the combustion engine heat exchanger 77, an exchange of heat is possible between the temperature-control medium 74 circulating through the heating circuit 73 and the coolant 12 circulating through the heating circuit 8. The combustion engine heat exchanger 77 is incorporated in the heating circuit 8 upstream of the radiator 20, such that the heat transferred by means of the combustion engine heat exchanger 77 to the heating circuit 8 can be fed to the radiator 20. In the example shown, the combustion engine heat exchanger 77 is incorporated in an associated branch 78 of the combustion engine circuit 73, wherein the branch 78 will hereinafter also be referred to as first combustion engine circuit branch 78. The first combustion engine circuit branch 78 branches off, downstream of the combustion engine 71 and upstream of the temperature-control medium heat exchanger 76, from a combustion engine circuit main branch 79 in which the temperature-control medium pump 75 and the temperature-control medium heat exchanger 76 are incorporated and to which the combustion engine 71 is connected in heat-transferring fashion. The first combustion engine circuit branch 78 opens out, upstream of the temperature-control medium pump 75 and downstream of the temperature-control medium heat exchanger 76 into the combustion engine circuit main branch 79. A temperature-control medium valve 80 is designed so as to selectively conduct and/or shut off the flow of the temperature-control medium 74 through the first combustion engine circuit branch 78 and thus through the combustion engine heat exchanger 76. The temperature-control medium valve 80 is in this case connected to the control device 66, such that the control device 66 can control the temperature-control medium valve 80 in closed-loop and open-loop fashion. In the example shown, a bypass 81 of the combustion engine circuit 73 is also provided, which bypass circumvents the temperature-control medium heat exchanger 76 and will hereinafter also be referred to as combustion engine circuit bypass branch 81. An associated valve device 82, which in the present case is designed as a three-way valve 45 and will hereinafter also be referred to as combustion engine circuit heat exchanger valve device 82, is designed, and connected to the control device 66, so as to conduct the temperature-control medium 74 selectively through the combustion engine circuit bypass branch 81 and/or through the temperature-control medium heat exchanger 76.

The combustion engine arrangement 70 has, aside from the combustion engine 71, a fresh-air installation 84 and an exhaust-gas installation 85. By means of the fresh-air installation 84, fresh air is supplied to the combustion engine 71 during the operation of the combustion engine 71. By means of the exhaust-gas installation 85, exhaust gas that is generated in the combustion engine 71 during operation is discharged. In the fresh-air installation 84, there may be incorporated an air cooler 86 for cooling the air that is to be fed to the combustion engine 71. In the example shown, in the fresh-air installation 84, there is furthermore arranged a compressor 87 for compressing the air that is to be said to the combustion engine 73, wherein the compressor 87 is arranged upstream of the air cooler 86. The air cooler 86 is thus in particular a charge-air cooler 88. The compressor 87 may be a constituent part of an exhaust-gas turbocharger 89, which, aside from the compressor 87, has a turbine 90 which drives the compressor 87 and which is arranged in the exhaust-gas installation 85. The combustion engine arrangement 70 may furthermore have an exhaust-gas recirculation line 91 which serves for recirculating exhaust gas to the combustion engine 71 and in which there is incorporated an exhaust-gas recirculation cooler 83. The exhaust-gas recirculation cooler 83 is, in a manner fluidically separate from the exhaust gas, incorporated in an associated branch 92 of the combustion engine circuit 73, which will hereinafter be referred to as second combustion engine circuit branch 92. Here, during operation, cooling of the exhaust gas flowing through the exhaust gas recirculation cooler 83 is performed by means of the temperature-control medium 74, such that heat is transferred to the temperature-control medium 74.

Figure 6:
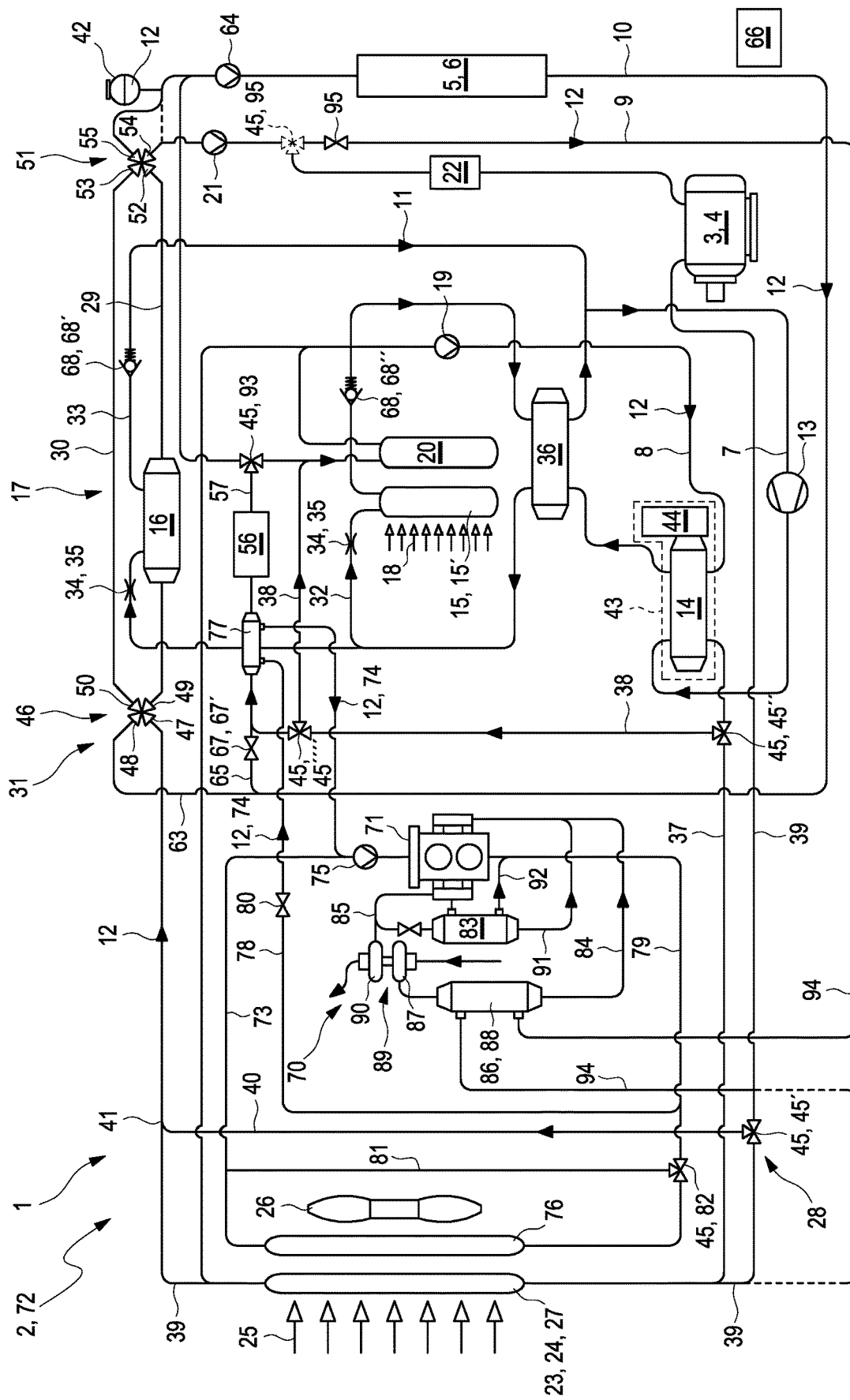

In the exemplary embodiment shown in FIG. 6, the combustion engine heat exchanger 77 is incorporated in the heating circuit 8 upstream of the electric heating device 56. Here, in this example, the combustion engine heat exchanger 77 is incorporated in the heating circuit heating branch 57, preferably directly upstream of the electric heating device 56. The combustion engine heat exchanger 77 is thus also incorporated, via the coolant circuit bypass arm 65, in the second coolant circuit 10. Furthermore, the combustion engine heat exchanger 77 is incorporated in the heating circuit 8 downstream of the condenser 14. It is thus possible for the coolant 12 to be heated by means of the combustion engine heat exchanger 77 before it enters the electric heating device 56, such that the energy subsequently required by the electric heating device 56 for the further heating of the coolant 12 is reduced. A valve device 93, hereinafter also referred to as coolant circuit bypass arm valve device 93, is designed so as to conduct the coolant 12 downstream of the heating device 56, that is to say in the example shown also downstream of the combustion engine heat exchanger 77, selectively through the heating circuit 8 and/or through the second coolant circuit 10, that is to say in the present case through the coolant circuit bypass arm 65. The coolant circuit bypass arm valve device 93 is correspondingly connected to the control device 66 and, in the example shown, is designed as a three-way valve 45.

The air cooler 86 of the combustion engine arrangement 70 is, in a manner fluidically separate from the fresh-air installation 84, incorporated in the first coolant circuit 9, such that an exchange of heat between the air flowing through the fresh-air installation 84 and the coolant 12 flowing through the first coolant circuit 9 is possible during operation by means of the air cooler 86. The air cooler 86 is incorporated in an associated branch 94 of the first coolant circuit 9, which will hereinafter also be referred to as air cooler branch 94. The drive device 3 is, in the coolant circuit main branch 39, connected in heat-transferring fashion to the first coolant circuit 9.

The air cooler branch 94 branches off from the coolant circuit main branch 39 upstream of the drive device 3 and downstream of the first coolant pump 21 and opens out into the coolant circuit main branch 39 downstream of the drive device 3. The air cooler branch 94 preferably opens out into the coolant circuit main branch 39 upstream of the heat exchanger 23. It is possible here for the air cooler branch 94 to open out into the coolant circuit main branch 39 upstream of the coolant circuit bypass branch 40 or, as indicated by dashed lines, downstream of the coolant circuit bypass branch 40. An air cooler branch valve 95 is designed so as to conduct the coolant 12 selectively through the air cooler branch 94 and/or past the air cooler branch 94. The air cooler branch valve 95 is, in the example shown, arranged in the air cooler branch 94. Alternatively or in addition, the air cooler branch valve device 95 may, as illustrated by dashed lines, be or have a three-way valve 45, and thus conduct the flow downstream of the first coolant pump 21 selectively into the air cooler branch 94 and/or in the direction of the on-board electronics system 22 and/or the drive device 3. In this way, it is possible for heat to be exchanged between the coolant 12 circulating through the first coolant circuit 9 and the air flowing through the fresh-air installation 84, in particular for the heat absorbed from the air to be transferred to the coolant 12.

Figure 7:
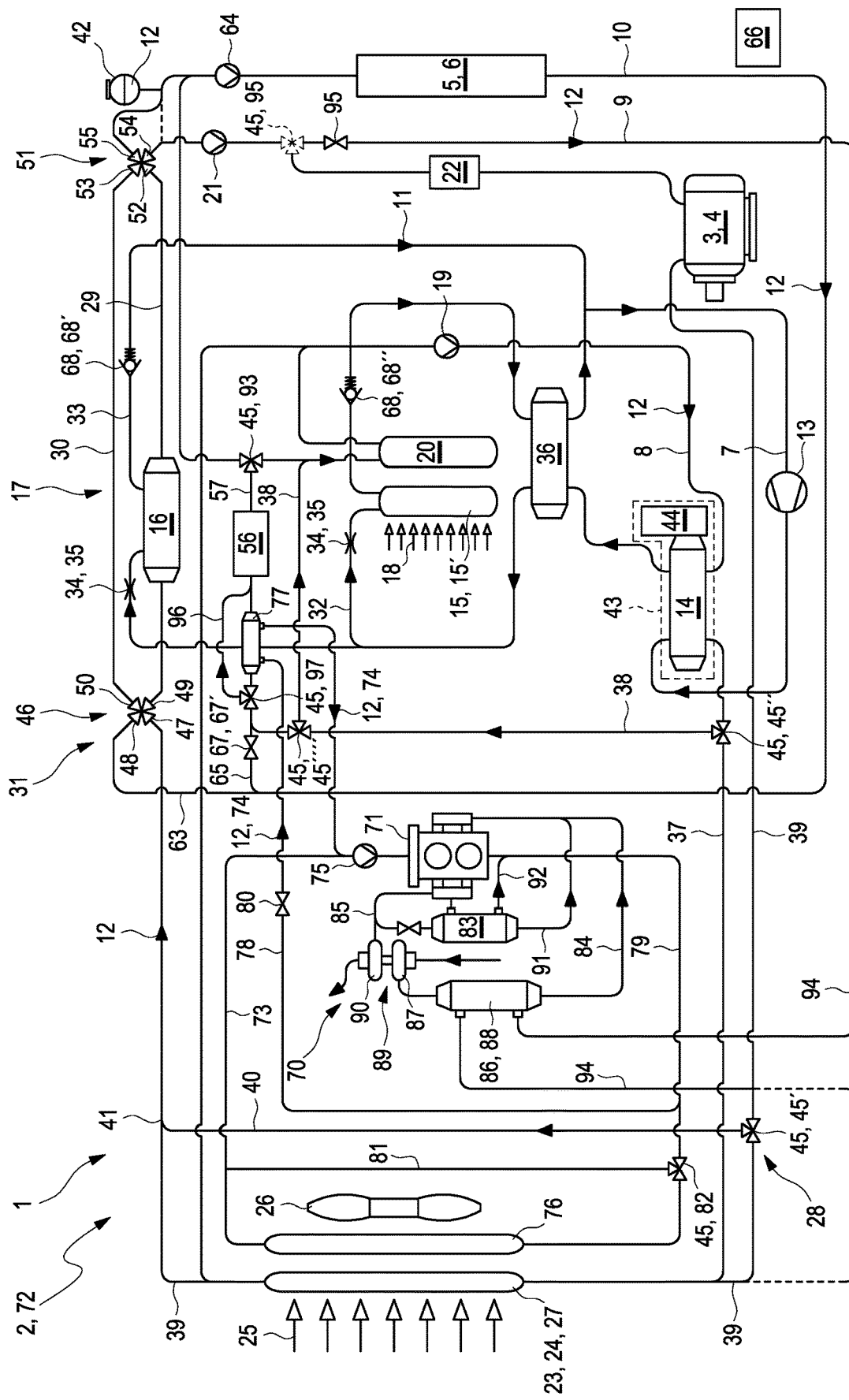

FIG. 7 shows a further exemplary embodiment of the thermal management system 1. This exemplary embodiment differs from the example shown in FIG. 6 in that the heating circuit 8 has a bypass branch 96, hereinafter also referred to as heating circuit heat exchanger bypass branch 96, which circumvents the combustion engine heat exchanger 77 and which opens out into the heating circuit 8 upstream of the heating device 56. In the example shown, the heating circuit heat exchanger bypass branch 96 opens out into the heating circuit heating branch 57 directly upstream of the electric heating device 56. An associated valve device 97, hereinafter also referred to as combustion engine heat exchanger valve device 97, is designed so as to conduct the coolant 12 selectively through the combustion engine heat exchanger 77 and/or through the heating circuit heat exchanger bypass branch 96. The combustion engine heat exchanger valve device 97 is in this case correspondingly connected to the control device 66. The combustion engine heat exchanger valve device 97 is, in the example shown, designed as a three-way valve 45. It is thus possible, as required, in particular when the combustion engine heat exchanger 77 is not flowed through by the temperature-control medium 74, for the coolant 12 to be conducted via the heating circuit heat exchanger bypass branch 96 past the combustion engine heat exchanger 77, such that corresponding pressure losses and/or thermal losses in the coolant 12 are reduced.

Figure 8:
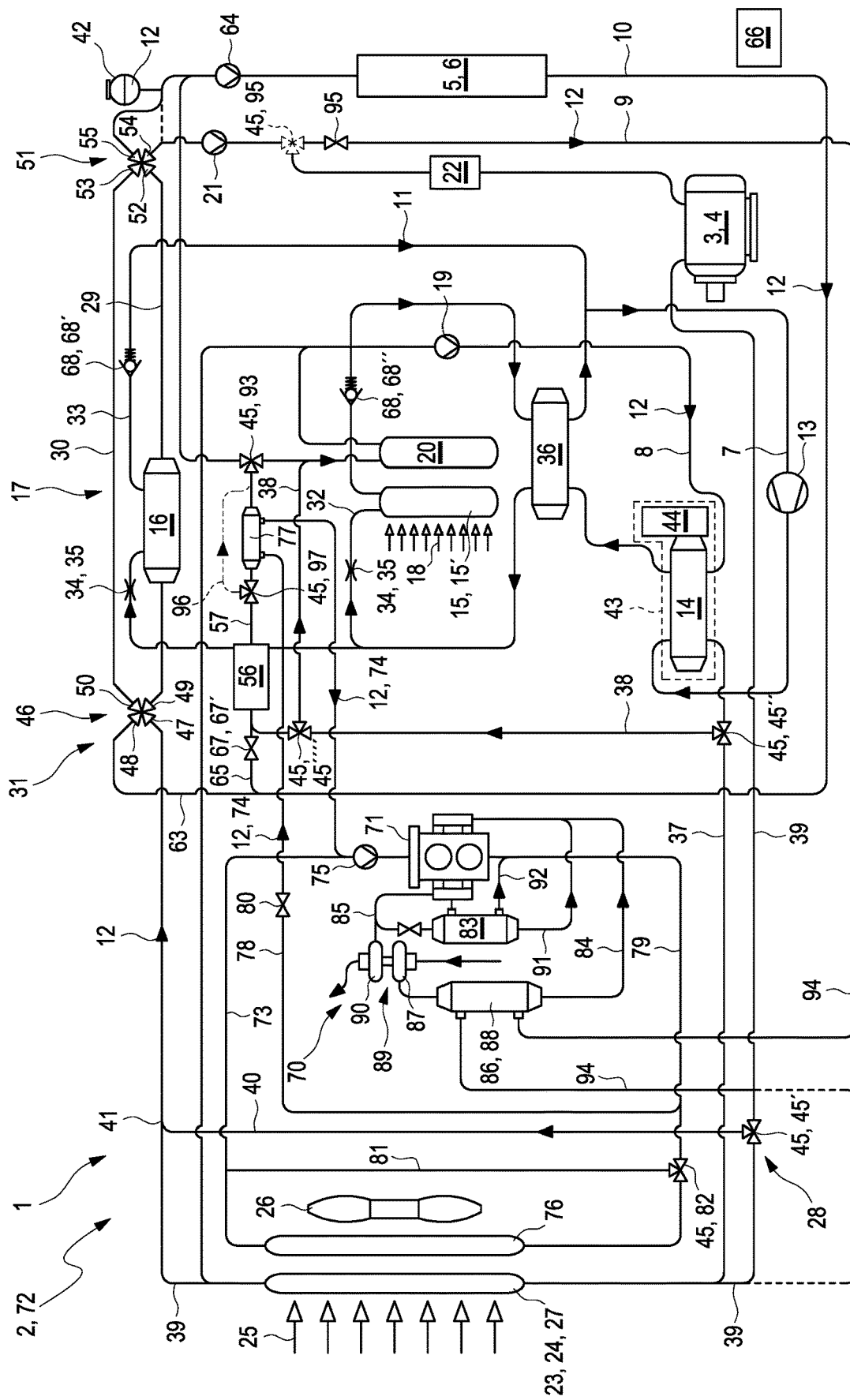

Another exemplary embodiment of the thermal management system 1 is shown in FIG. 8. This exemplary embodiment differs from the exemplary embodiment shown in FIG. 6 in that the combustion engine heat exchanger 77 is arranged in the heating circuit 8 downstream of the heating device 56 and upstream of the radiator 20. It is thus possible, in particular when the heating device 56 is not in operation, for pressure losses and/or thermal losses in the coolant 12 that arise when flow passes through the heating device 56 to be reduced. Here, as indicated by dashed lines, it is also possible in this exemplary embodiment for a heating circuit heat exchanger bypass branch 96 with associated valve device 97 to be provided, wherein the heating circuit heat exchanger bypass branch 96 is arranged downstream of the heating device 56 and opens out into the heating circuit 8 upstream of the radiator 20.

Figure 9:
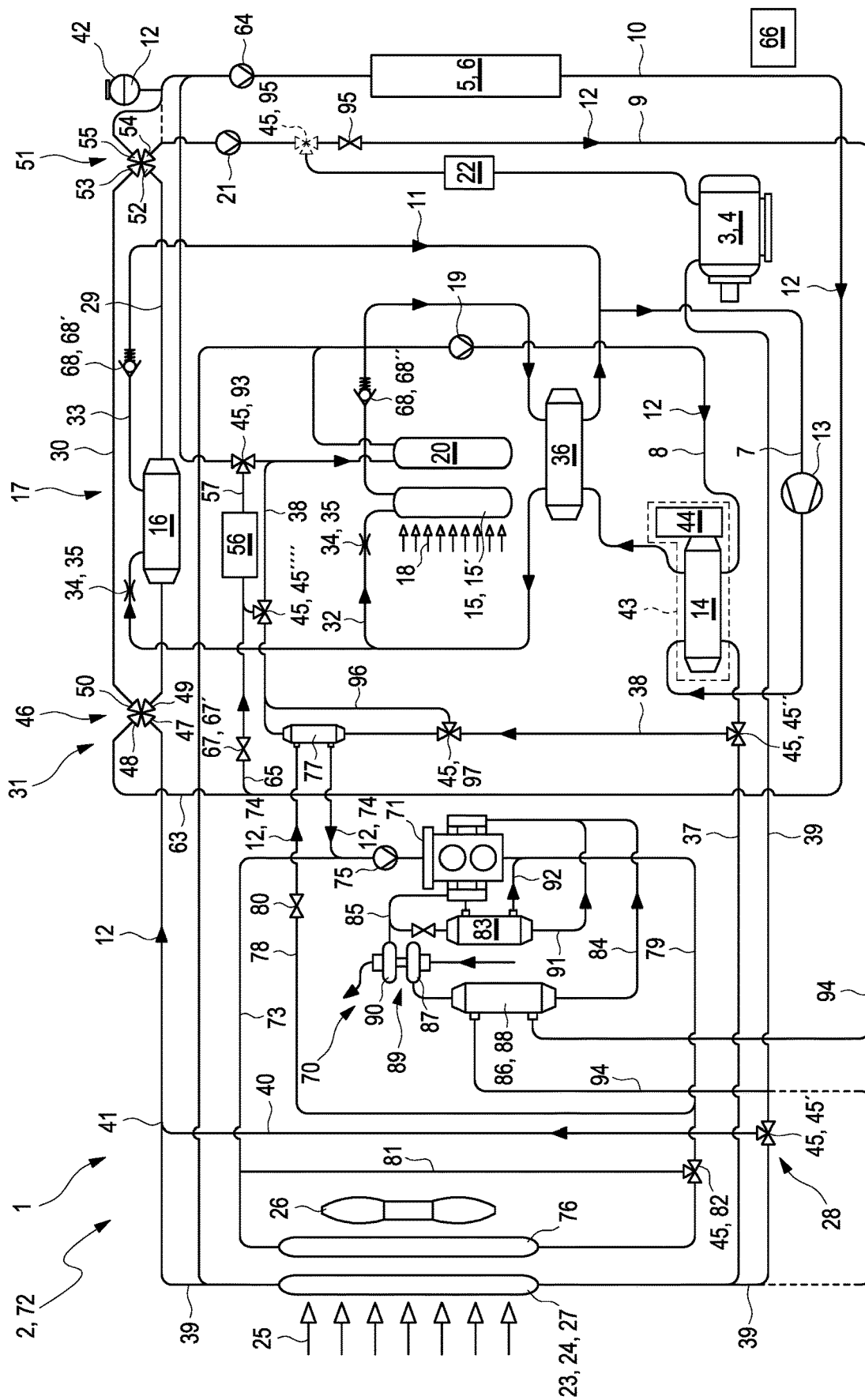

Another exemplary embodiment of the thermal management system 1 is illustrated in FIG. 9. This exemplary embodiment differs from the example shown in FIG. 7 in that the combustion engine heat exchanger 77 is incorporated in the heating circuit 8 outside the heating circuit heating branch 57 and in the heating circuit bypass branch 38. If the heating device 56 is not in operation, then a heat transfer between the heating circuit 8 and the combustion engine circuit 73 can take place in simplified fashion, with the heating device 56 being circumvented.

Figure 10:
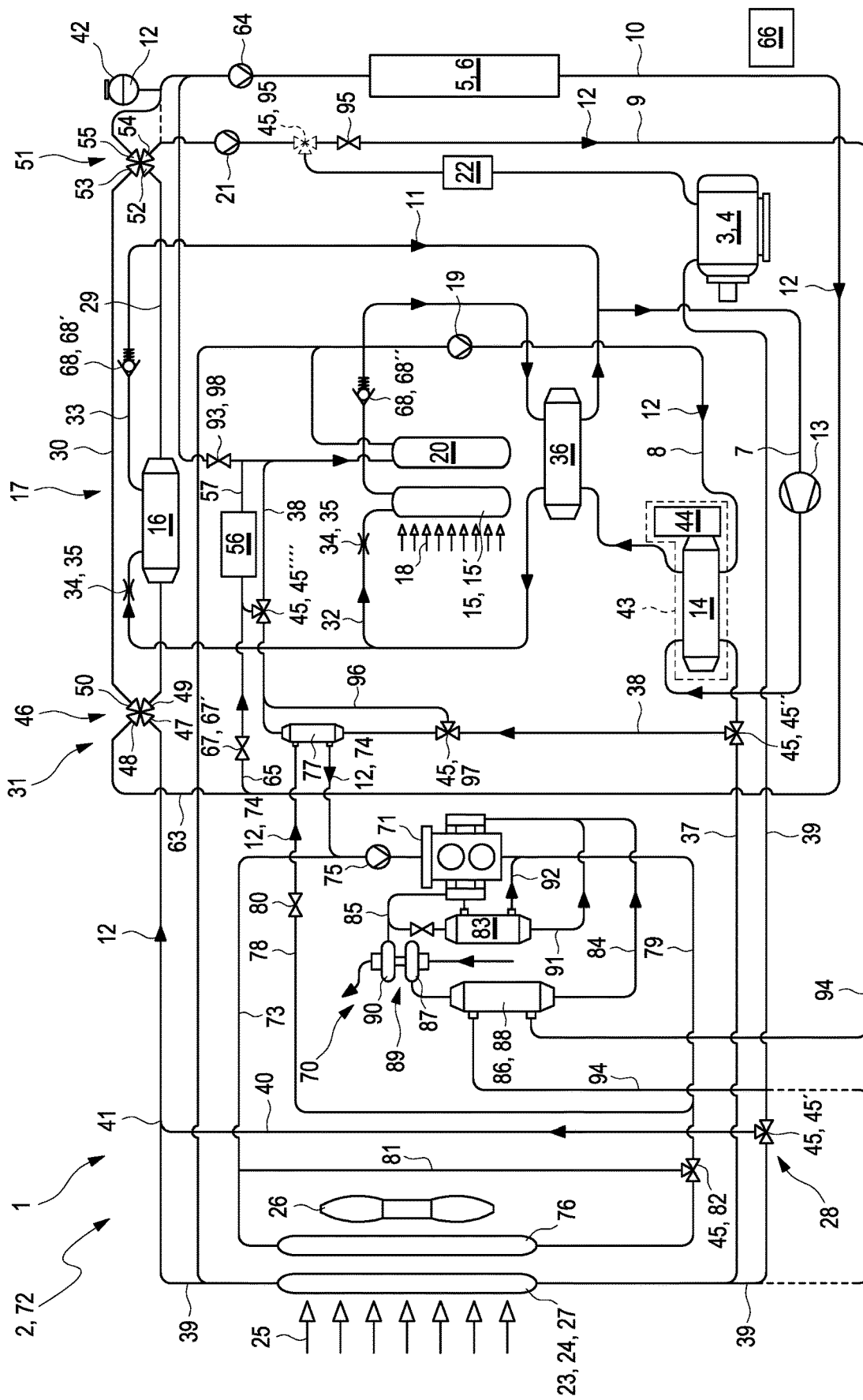

A further exemplary embodiment of the thermal management system 1 is shown in FIG. 10. This exemplary embodiment differs from the example shown in FIG. 9 in that the valve device 93 for dividing up the flow of the coolant 12 downstream of the heating device 56 between the heating circuit 8 and the second coolant circuit 10, that is to say the coolant circuit bypass arm valve device 93, is designed as a simple, preferably closed-loop-controllable, shut-off valve 98, such that the dividing-up of the flow of the coolant 12 into the heating circuit 8 and the second coolant circuit 10 is performed in a simplified manner. The shut-off valve 98 is preferably correspondingly connected to the control device 66. In the example shown, the shut-off valve 98 is furthermore arranged in the coolant circuit bypass arm 65 of the second coolant circuit 10.

The flow of the temperature-control medium 74 through the combustion engine heat exchanger 77 may in principle be configured in any desired manner in relation to the flow of the coolant 12 through the combustion engine heat exchanger 77.

In the examples of FIGS. 6 to 8, coolant 12 and temperature-control medium 74 flow in the same direction, that is to say in a concurrent-flow configuration. In the examples of FIGS. 9 and 10, the flow of the temperature-control medium 74 is opposite to the flow of the coolant 12, such that coolant 12 and temperature-control medium 74 are in a countercurrent configuration in the combustion engine heat exchanger 77.

It is also conceivable for a different relative flow of the coolant 12 with respect to the temperature-control medium 74 to be provided in the combustion engine heat exchanger 77 in the respective example. The exemplary embodiment shown in FIG. 11 corresponds to the exemplary embodiment of FIG. 6 with the exception that the flow of the temperature-control medium 74 through the combustion engine heat exchanger 77 takes place counter to the flow direction of the coolant 12 through the combustion engine heat exchanger 77, that is to say in a countercurrent configuration.

Figure 11:
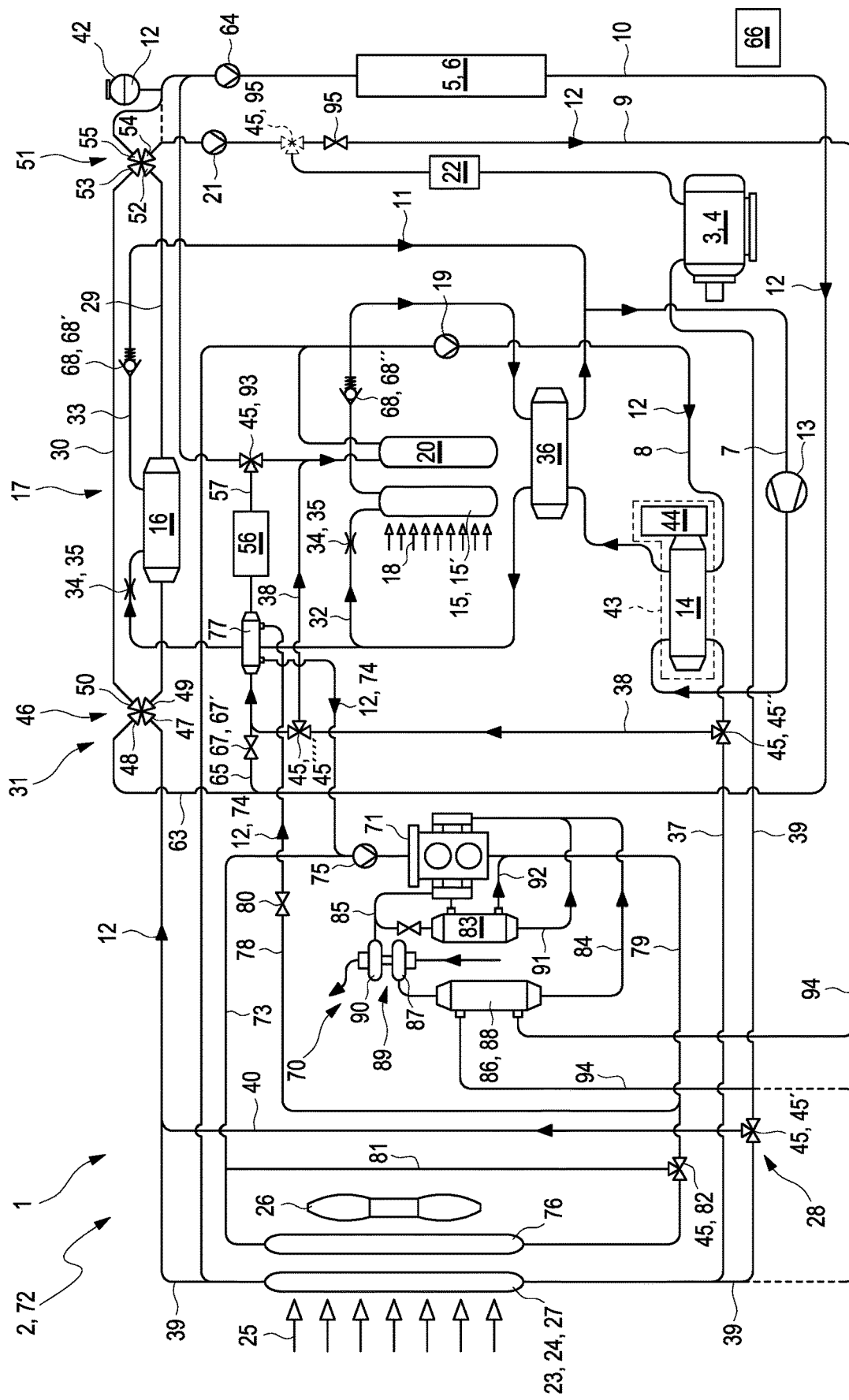
Figure 12:
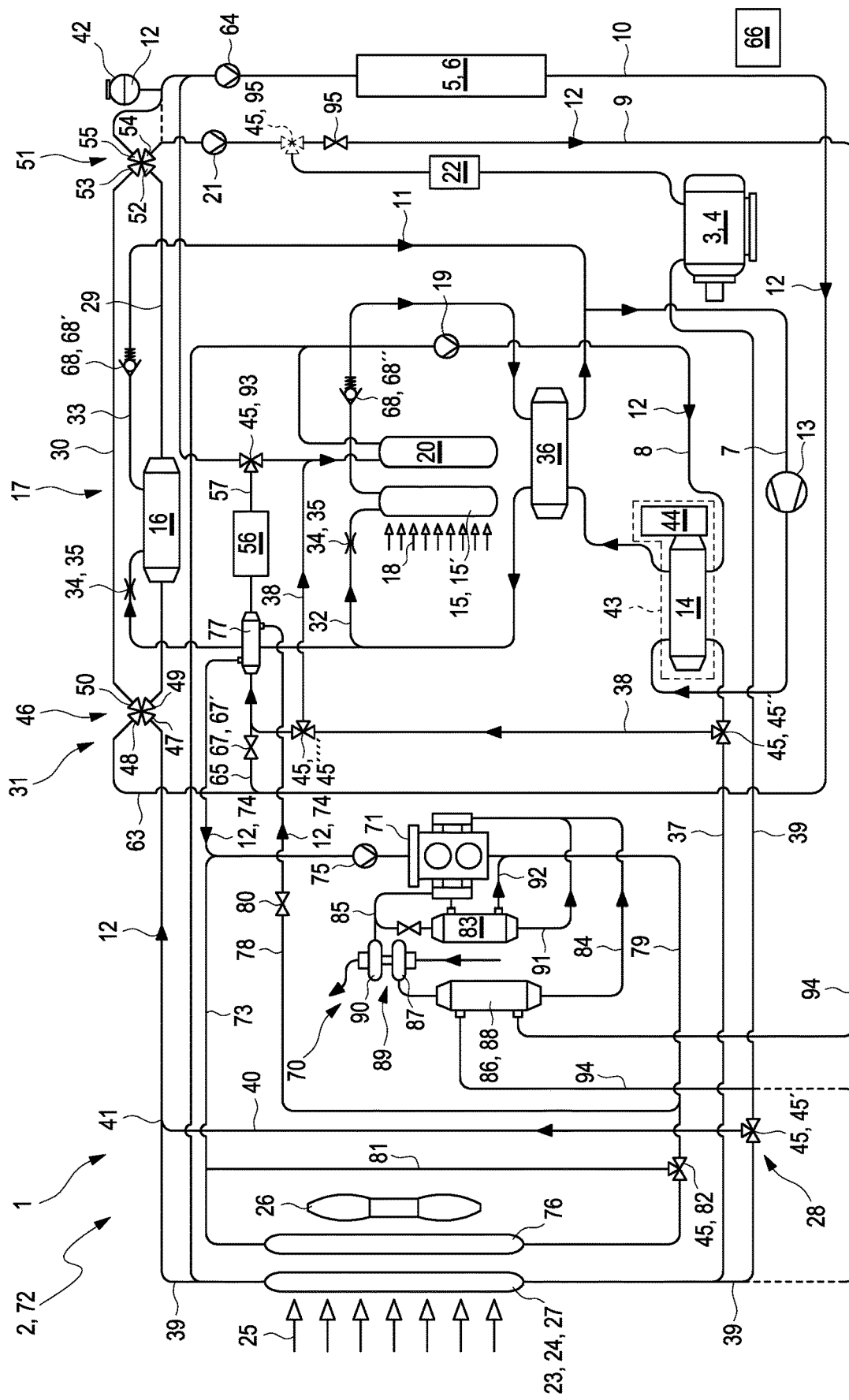

The exemplary embodiment shown in FIG. 12 corresponds to the exemplary embodiment of FIG. 7 or FIG. 11 with the exception that the flow of temperature-controlled medium 74 through the combustion engine heat exchanger 77 takes place transversely with respect to the flow of the coolant 12 through the combustion engine heat exchanger 77, that is to say in a cross-flow configuration.

In the abovementioned heating modes of the thermal management system 1 or in special heating modes, it is possible here for the heat originating from the combustion engine circuit 73 to be transferred by means of the combustion engine heat exchanger 77 to the heating circuit 8 and thus to the radiator 20 and/or to the second coolant circuit 10 and thus to the store 5. Conversely, it is possible for heat from the heating circuit 8 and/or from the second coolant circuit 10 to be transferred via the combustion engine heat exchanger 77 to the combustion engine circuit 73, wherein said heat may be used for example for pre-heating the combustion engine 71.

Via the air cooler 86, it is furthermore possible for heat absorbed from the air in the fresh-air installation 74 to be transferred to the coolant 12 in the first coolant circuit 9. If, for example, in particular by means of the first cooling circuit valve 45' and/or the air cooler branch valve 95, the flow of the coolant 12 via the drive device 3 and/or the on-board electronics system 22 is shut off and the coolant 12 is conducted via the air cooler branch 94, improved cooling of the air that is to be fed to the combustion engine 71, in particular so-called supercooling of the air in a supercooling mode of the system, is possible. Here, the coolant 12 circulating through the first coolant circuit 9 is preferably conducted through the chiller 16 by means of the chiller guide 17, and the coolant 12 of the second coolant circuit 10 is conducted past the chiller 16. Furthermore, the chiller is flowed through by the refrigerant 11, such that further cooling of the air cooler 86 is realized.

The invention claimed is:

1. A thermal management system for a vehicle having an electric drive device and an electrical store for providing a supply to the drive device, the thermal management system comprising:
    a refrigerant circuit in which a refrigerant circulates during operation and in which a refrigerant compressor configured to compress the refrigerant, a condenser configured to condense the refrigerant, and an evaporator configured to evaporate the refrigerant and cool air for feeding to a vehicle interior compartment of the vehicle are incorporated;
    a heating circuit fluidically separate from the refrigerant circuit in which a coolant circulates during operation and in which a heating circuit pump configured to convey the coolant and a radiator configured to heat air for feeding to the vehicle interior compartment are incorporated;
    a first coolant circuit fluidically separate from the refrigerant circuit configured for a temperature control of the drive device, in which the coolant circulates during operation, and in which a first coolant pump configured to convey the coolant is incorporated, the first coolant circuit connectable to the drive device in heat-transferring fashion;
    a second coolant circuit fluidically separate from the refrigerant circuit configured for a temperature control of the electrical store, in which the coolant circulates during operation, and in which a second coolant pump configured to convey the coolant is incorporated, the second coolant circuit connectable to the electrical store in heat-transferring fashion;
    a heat exchanger structured and arranged to exchange heat with a surrounding of the thermal management system and including a heat exchanger valve device configured to fluidically connect the heat exchanger selectively to the heating circuit and to the first coolant circuit;
    the condenser of the refrigerant circuit incorporated in the heating circuit for a heat transfer to the coolant circulating through the heating circuit;
    a chiller incorporated in the refrigerant circuit for heat transfer to the refrigerant;
    a chiller guide fluidically separate from the refrigerant circuit, the chiller guide having a chiller path configured to conduct the coolant and which extends through the chiller, and a bypass path configured to conduct the coolant and which circumvents the chiller;
    a chiller valve device configured to, upstream of the chiller, selectively fluidically connect one of i) the first coolant circuit to the chiller path and the second coolant circuit to the bypass path, and ii) the first coolant circuit to the bypass path and the second coolant circuit to the chiller path; and
    a control device configured to operate the thermal management system.

2. The system according to claim 1, wherein the chiller valve device is further configured to, downstream of the chiller, selectively connect one of i) the chiller path to the first coolant circuit and the bypass path to the second coolant circuit and ii) the chiller path to the second coolant circuit and the bypass path to the first coolant circuit.

3. The system according to claim 1, wherein the refrigerant circuit has a chiller branch in which the chiller is incorporated, and an evaporator branch in which the evaporator is incorporated.

4. The system according to claim 1, wherein:
the heating circuit has a heating circuit main branch extending through the heat exchanger, and a heating circuit bypass branch which circumvents the heat exchanger and in which the radiator is incorporated; and
the heat exchanger valve device is further configured to conduct the coolant circulating in the heating circuit selectively through at least one of the heating circuit main branch and the heating circuit bypass branch.

5. The system according to claim 4, wherein:
the first coolant circuit has a coolant circuit main branch extending through the heat exchanger, and a coolant circuit bypass branch which circumvents the heat exchanger;
the heat exchanger valve device is further configured to conduct the coolant circulating in the first coolant circuit selectively through at least one of the coolant circuit main branch and the coolant circuit bypass branch; and
the heating circuit main branch and the coolant circuit main branch extend fluidically jointly through the heat exchanger.

6. The system according to claim 4, wherein:
the first coolant circuit has a coolant circuit main branch extending through the heat exchanger, and a coolant circuit bypass branch which circumvents the heat exchanger;
the heat exchanger valve device is further configured to conduct the coolant circulating in the first coolant circuit selectively through at least one of the coolant circuit main branch and the coolant circuit bypass branch;
the heat exchanger valve device includes a heating circuit valve arranged in the heating circuit for dividing a flow of the coolant in the heating circuit between the heating circuit main branch and the heating circuit bypass branch; and
the heat exchanger valve device includes a first cooling circuit valve arranged in the first coolant circuit for dividing a flow of the coolant in the first coolant circuit between the coolant circuit main branch and the coolant circuit bypass branch.

7. The system according to claim 1, wherein:
the first coolant circuit has a coolant circuit main branch extending through the heat exchanger, and a coolant circuit bypass branch which circumvents the heat exchanger; and
the heat exchanger valve device is further configured to conduct the coolant circulating in the first coolant circuit selectively through at least one of the coolant circuit main branch and the coolant circuit bypass branch.

8. The system according to claim 1, wherein:
the second coolant circuit has a coolant circuit main arm extending through the chiller guide, and a coolant circuit bypass arm which circumvents the chiller guide; and
the second coolant circuit includes a coolant valve configured to conduct the coolant circulating in the second coolant circuit selectively through at least one of the coolant circuit main arm and the coolant circuit bypass arm.

9. The system according to claim 8, further comprising an electric heating device configured to heat coolant, wherein the electric heating device is incorporated in a heating circuit heating branch of the heating circuit upstream of the radiator, and wherein the coolant circuit bypass arm extends through the electric heating device.

10. The system according to claim 9, further comprising a coolant circuit bypass arm valve device configured to conduct the coolant downstream of the electric heating device through at least one of the second coolant circuit and the heating circuit.

11. The system according to claim 1, wherein the chiller valve device includes, upstream of the chiller, a first four-way valve adjustable between a first position in which the first four-way valve fluidically connects the first coolant circuit to the chiller path and the second coolant circuit to the bypass path, and a second position in which the first four-way valve fluidically connects the second coolant circuit to the chiller path and the first coolant circuit to the bypass path.

12. The system according to claim 1, wherein the chiller valve device includes, downstream of the chiller, a second four-way valve adjustable between a first position in which the second four-way valve fluidically connects the chiller path to the first coolant circuit and the bypass path to the second coolant circuit, and a second position in which the second four-way valve fluidically connects the chiller path to the second coolant circuit and the bypass path to the first coolant circuit.

13. The system according to claim 1, wherein, in the refrigerant circuit, upstream of the chiller, there is arranged a throttle device configured to vary a flow of the refrigerant through the chiller.

14. The system according to claim 1, wherein the first coolant circuit is connectable to an on-board electronics system of the vehicle in heat-transferring fashion to cool the on-board electronics system.

15. The system according to claim 1, wherein the control device is configured to operate the system in a first cooling mode where:
the coolant in the first coolant circuit is conducted via the bypass path past the chiller and the coolant in the second coolant circuit is conducted via the chiller path through the chiller such that a separate flow of the coolant is flowable through the first coolant circuit and the second coolant circuits; and
the coolant flowing through the heating circuit is conducted via the heat exchanger, and the radiator is circumvented.

16. The system according to claim 15, wherein the control device is configured to further operate the system such that:
all of the coolant in the heating circuit is conducted through the heat exchanger; and
all of the coolant in the first coolant circuit is conducted through the heat exchanger.

17. The system according to claim 1, wherein the control device is configured to operate the system in a second cooling mode where:
one of i) the bypass path is fluidically connected, upstream of the chiller, to the first coolant circuit and, downstream of the chiller, to the second coolant circuit, and the chiller path is fluidically connected, upstream of the chiller, to the second coolant circuit and, downstream of the chiller, to the first coolant circuit, and ii)

the bypass path is fluidically connected, upstream of the chiller, to the second coolant circuit and, downstream to the first coolant circuit, and the chiller path is fluidically connected, upstream of the chiller, to the first coolant circuit and, downstream of the chiller, to the second coolant circuit, such that the coolant flowing through the first coolant circuit flows into the second coolant circuit downstream of the chiller and the coolant flowing through the second coolant circuit flows into the first coolant circuit downstream of the chiller; and a flow of the refrigerant through the chiller is shut off.

18. The system according to claim 1, wherein the control device is configured to operate the system in a third cooling mode where:

the coolant in the second coolant circuit is conducted via the chiller path through the chiller such that a separate flow of the coolant is flowable through the first coolant circuit and the second coolant circuits;

the coolant flowing through the heating circuit is conducted via the heat exchanger, and the radiator is circumvented; and a flow of the refrigerant through the evaporator is shut off.

19. The system according to claim 18, wherein the control device is configured to further operate the system such that:

all of the coolant in the heating circuit is conducted through the heat exchanger; and all of the coolant in the first coolant circuit is conducted past the heat exchanger.

20. The system according to claim 1, wherein the control device is configured to operate the system in a first heating mode where:

the coolant in the first coolant circuit is conducted via the chiller path through the chiller and the coolant in the second coolant circuit is conducted via the bypass path past the chiller such that a separate flow of the coolant is flowable through the first coolant circuit and the second coolant circuit;

the coolant flowing through the heating circuit is conducted via the radiator, and the heat exchanger is circumvented; and a flow of the refrigerant through the chiller is shut off, and the refrigerant is conducted through the evaporator.

21. The system according to claim 20, wherein the control device is configured to further operate the system such that:

all of the coolant in the heating circuit is conducted past the heat exchanger; and all of the coolant in the first coolant circuit is conducted through the heat exchanger.

22. The system according to claim 1, wherein the control device is configured to operate the system in a second heating mode where:

the coolant flowing through the first cooling circuit is conducted via the chiller path through the chiller such that, in the first coolant circuit, a flow of the coolant is separate from the second coolant circuit;

the coolant flowing through the heating circuit is conducted via the radiator;

the refrigerant in the refrigerant circuit is conducted through the chiller; and the coolant flowing through the first coolant circuit is conducted past the heat exchanger.

23. The system according to claim 22, wherein the control device further configured such that the refrigerant in the refrigerant circuit is conducted through the evaporator.

24. The system according to claim 22, wherein the control device is configured to further operate the system such that:

all of the coolant in the heating circuit is conducted past the heat exchanger; and all of the coolant in the first coolant circuit is conducted past the heat exchanger.

25. The system according to claim 1, wherein the control device is configured to operate the system in a third heating mode where:

the coolant flowing through the first coolant circuit is conducted via the chiller path through the chiller such that, in the first coolant circuit, a flow of the coolant is separate from the second coolant circuit;

the coolant flowing through the heating circuit is conducted via the radiator;

the refrigerant in the refrigerant circuit is conducted through the chiller; and the coolant flowing through the first coolant circuit is conducted through the heat exchanger when a temperature of the coolant at an outlet of the drive device lies below a temperature outside the heat exchanger.

26. The system according to claim 25, wherein the control device is configured to further operate the system such that:

the coolant in the heating circuit is conducted partially through the heat exchanger and partially past the heat exchanger; and the coolant in the first coolant circuit is conducted partially through the heat exchanger and partially past the heat exchanger.

27. The system according to claim 1, further comprising an electric heating device configured to heat coolant, wherein the electric heating device is incorporated in a heating circuit heating branch of the heating circuit upstream of the radiator.

28. The system according to claim 27, wherein the control device is configured to operate the system in a fourth heating mode where:

the coolant flowing through the heating circuit is conducted through and heated via the electric heating devices; and the coolant is subsequently conducted through the radiator.

29. The system according to claim 27, wherein the control device is configured to operate the system in a fifth heating mode where the coolant flowing through the second coolant circuit is conducted through and heated via the electric heating device.

30. The system according to claim 1, wherein the control device is configured to operate the system in a sixth heating mode where:

the coolant in the second coolant circuit is conducted via the chiller path through the chiller; and the coolant flowing through the heating circuit is conducted via the radiator.

31. The system according to claim 1, further comprising a combustion engine circuit fluidically separate from the refrigerant circuit configured for a temperature control of a combustion engine of a combustion engine arrangement, in which a temperature-control medium circulates during operation, and in which a temperature-control medium pump configured to convey the temperature-control medium through the combustion engine circuit and a temperature-control medium heat exchanger configured to cool the temperature-control medium are incorporated, wherein the combustion engine circuit is connectable to the combustion engine in heat-transferring fashion.

32. The system according to claim 31, further comprising a combustion engine heat exchanger incorporated in the combustion engine circuit and in the heating circuit.

33. The system according to claim 32, further comprising an electric heating device configured to heat coolant, wherein the electric heating device is incorporated in a heating circuit heating branch of the heating circuit upstream of the radiator, and wherein the combustion engine heat exchanger is incorporated in the heating circuit upstream of the electric heating device and downstream of the condenser.

34. The system according to claim 33, wherein the combustion engine heat exchanger is incorporated in the heating circuit heating branch of the heating circuit.

35. The system according to claim 32, further comprising a combustion engine heat exchanger valve device, wherein:
the heating circuit has a heating circuit heat exchanger bypass branch which circumvents the combustion engine heat exchanger; and
the combustion engine heat exchanger valve device is configured to conduct the coolant selectively through at least one of the combustion engine heat exchanger and the heating circuit heat exchanger bypass branch.

36. The system according to claim 31, wherein:
the combustion engine arrangement includes a fresh-air installation configured to feed fresh air to the combustion engine and in which an air cooler for cooling the fresh air is incorporated;
the first coolant circuit has an air cooler branch which circumvents the drive device, the air cooler incorporated, fluidically separately from the fresh-air installation, in the air cooler branch;
the first coolant pump is arranged upstream of the air cooler branch; and
the air cooler branch opens into a coolant circuit main branch of the first coolant circuit extending through the heat exchanger upstream of the heat exchanger.

37. The system according to claim 36, wherein the control device is configured to operate the system in a supercooling mode where:
a flow of the coolant in the first coolant circuit for cooling at least one of the drive device and an on-board electronics system of the vehicle is shut off;
the coolant is conducted via the air cooler branch;
the coolant circulating through the first coolant circuit is conducted through the chiller and the coolant of the second coolant circuit is conducted past the chiller; and
the chiller is flowed through by the refrigerant.

38. A vehicle having comprising a vehicle interior compartment, an electric drive device, an electrical store configured to provide a supply to the electric drive device, and a thermal management system, the thermal management system including:
a refrigerant circuit in which a refrigerant circulates during operation and in which a refrigerant compressor configured to compress the refrigerant, a condenser configured to condense the refrigerant, and an evaporator configured to evaporate the refrigerant and cool air for feeding to the vehicle interior compartment are incorporated;
a heating circuit fluidically separate from the refrigerant circuit in which a coolant circulates during operation and in which a heating circuit pump configured to convey the coolant and a radiator configured to heat air for feeding to the vehicle interior compartment are incorporated;
a first coolant circuit fluidically separate from the refrigerant circuit configured for a temperature control of the drive device, in which the coolant circulates during operation, and in which a first coolant pump configured to convey the coolant is incorporated, the first coolant circuit connected to the drive device in heat-transferring fashion;
a second coolant circuit fluidically separate from the refrigerant circuit configured for a temperature control of the electrical store, in which the coolant circulates during operation, and in which a second coolant pump configured to convey the coolant is incorporated, the second coolant circuit connected to the electrical store in heat-transferring fashion;
a heat exchanger structured and arranged to exchange heat with a surrounding of the thermal management system and including a heat exchanger valve device configured to fluidically connect the heat exchanger selectively to the heating circuit and to the first coolant circuit;
the condenser of the refrigerant circuit incorporated in the heating circuit for a heat transfer to the coolant circulating through the heating circuit;
a chiller incorporated in the refrigerant circuit for heat transfer to the refrigerant;
a chiller guide fluidically separate from the refrigerant circuit, the chiller guide having a chiller path configured to conduct the coolant and which extends through the chiller, and a bypass path configured to conduct the coolant and which circumvents the chiller;
a chiller valve device configured to, upstream of the chiller, selectively fluidically connect one of i) the first coolant circuit to the chiller path and the second coolant circuit to the bypass path, and ii) the first coolant circuit to the bypass path and the second coolant circuit to the chiller path; and
a control device configured to operate the thermal management system.

* * * * *